United States Patent [19]

Mattson

[11] Patent Number: 5,717,893
[45] Date of Patent: Feb. 10, 1998

[54] METHOD FOR MANAGING A CACHE HIERARCHY HAVING A LEAST RECENTLY USED (LRU) GLOBAL CACHE AND A PLURALITY OF LRU DESTAGING LOCAL CACHES CONTAINING COUNTERPART DATATYPE PARTITIONS

[75] Inventor: Richard Lewis Mattson, San Jose, Calif.

[73] Assignee: International Business Machines Corporation, Armonk, N.Y.

[21] Appl. No.: 703,309

[22] Filed: May 20, 1991

Related U.S. Application Data

[63] Continuation-in-part of Ser. No. 327,204, Mar. 22, 1989, abandoned.

[51] Int. Cl.$^6$ ............................. G06F 12/12; G06F 13/00
[52] U.S. Cl. ............................. 395/456; 395/480; 395/463
[58] Field of Search ............................. 395/425, 600, 395/456, 446, 447, 457, 497.04, 463, 487, 449, 621, 480

[56] References Cited

U.S. PATENT DOCUMENTS

| | | | |
|---|---|---|---|
| 4,371,929 | 2/1983 | Brann et al. | 395/865 |
| 4,430,712 | 2/1984 | Coulson et al. | 395/621 |
| 4,442,487 | 4/1984 | Fletcher et al. | 395/449 |
| 4,458,310 | 7/1984 | Chang | 395/446 |
| 4,463,424 | 7/1984 | Mattson et al. | 395/463 |
| 4,476,526 | 10/1984 | Dodd | 395/440 |
| 4,503,501 | 3/1985 | Coulson et al. | 395/456 |
| 4,636,946 | 1/1987 | Hartung et al. | 395/463 |
| 4,754,394 | 6/1988 | Brantley, Jr. et al. | 395/405 |
| 4,755,930 | 7/1988 | Wilson, Jr. et al. | 395/449 |
| 4,797,814 | 1/1989 | Brenza | 395/403 |
| 4,835,686 | 5/1989 | Furuya et al. | 395/463 |
| 4,905,141 | 2/1990 | Brenza | 395/456 |
| 4,920,478 | 4/1990 | Furuya et al. | 395/463 |
| 5,043,885 | 8/1991 | Robinson | 395/460 |
| 5,117,350 | 5/1992 | Parrish et al. | 395/401 |

FOREIGN PATENT DOCUMENTS

| | | |
|---|---|---|
| 203601 | 3/1986 | European Pat. Off. |
| 8301323 | 4/1983 | WIPO |
| 8402013 | 5/1984 | WIPO |

OTHER PUBLICATIONS

"Vertical Partitioning in Cache Hierarchies," IBM Technical Disclosure Bulletin vol. 30, No. 8, Jan. 1988, p. 33.

*Primary Examiner*—Glenn Gossage
*Attorney, Agent, or Firm*—R. Bruce Brodie; Ester E. Klein

[57] ABSTRACT

A method for managing a cache hierarchy having a fixed total storage capacity is disclosed. The cache hierarchy is logically partitioned to form a least recently used (LRU) global cache and a plurality of LRU destaging local caches. The global cache stores objects of all types and maintains them in LRU order. In contrast, each local cache is bound to objects having a unique data type T(i), where i is indicative of a DataType. Read and write accesses by referencing processors or central processing units (CPU's) are made to the global cache. Data not available in the global cache is staged thereto either from one of the local caches or from external storage. When a cache full condition is reached, placement of the most recently used (MRU) data element to the top of the global cache results in an LRU data element of type T(i) being destaged from the global cache to a corresponding one of the local caches storing type T(i) data. Likewise, when a cache full condition is reached in any one or more of the local caches, the local caches in turn will destage their LRU data elements to external storage. The parameters defining the partitions are externally supplied.

1 Claim, 22 Drawing Sheets

LRU-List Physical Storage

FIG. 4d — Available Space Formats

| Relative Byte Address | | |
|---|---|---|
| 00 | (cn) Control Bits | 60 |
| 02 | Not Used | |
| 04 | Not Used | |
| 08 | Not Used | |
| 12 | (ca) Cache Array Address | 63 |
| 16 | (AF) Available-List FWD Pointer | 71 |
| 20 | (AB) Available-List BAK Pointer | 72 |
| 24 | Not Used | |
| 28 | Not Used | |
| 32 | | |

54

FIG. 4c — Partition-Entry Formats

| Relative Byte Address | | |
|---|---|---|
| 00 | (cn) Control Bits | 60 |
| 02 | (PN) Partition Name | 68 |
| 04 | Reserved | |
| 08 | (MB) Max # Blocks | 69 |
| 12 | (NB) Act # Blocks | 70 |
| 16 | (LF) LRU-List FWD Pointer | 64 |
| 20 | (LB) LRU-List BAK Pointer | 65 |
| 24 | (PF) Partition FWD Pointer | 66 |
| 28 | (PB) Partition BAK Pointer | 67 |
| 32 | | |

58

FIG. 4b — LRU-List-Entry Formats

| Relative Byte Address | | |
|---|---|---|
| 00 | (cn) Control Bits | 60 |
| 02 | (DT) Data Type | 61 |
| 04 | (na) Name | 62 |
| 08 | Name (Con't) | |
| 12 | (ca) Cache Array Address | 63 |
| 16 | (LF) LRU-List FWD Pointer | 64 |
| 20 | (LB) LRU-List BAK Pointer | 65 |
| 24 | (PF) Partition FWD Pointer | 66 |
| 28 | (PB) Partition BAK Pointer | 67 |
| 32 | | |

56

Relative Bit Address of Control Field

60

| | | | |
|---|---|---|---|
| bit 00 | (er) = 1 | ==> | Empty Row |
| bit 01 | (ie) = 1 | ==> | LRU-List-Entry Row |
| bit 02 | (pe) = 1 | ==> | Partition-Entry Row |
| bit 03 | (ac) = 1 | ==> | Available Cache Space Row |
| bit 04 | (pz) = 1 | ==> | Block in Partition Zero |
| bit 05 | (ic) = 1 | ==> | Block in Cache |
| bit 06 | (db) = 1 | ==> | Dirty or Clean Block |
| bit 07 | (it) == 1 | ==> | Block in Transit |
| bit 08 | Reserved | | |
| bit 09 | Reserved | | |
| ... | | | |
| bit 15 | Reserved | | |

Control Field Layout

FIG. 4e

Possible Byte Layout for Name Fields

| row | 00 | 01 | 02 | 03 | 04 | 05 | 06 | 07 | 08 | 09 | 10 | 11 | 12 |
|---|---|---|---|---|---|---|---|---|---|---|---|---|---|
| 100 — a | cn | | DT | | DEV | | Cyl | | Hd | | Rec | | |
| 101 — b | cn | | DT | | DBID | | PSID | | Sec | | Page | | |
| 102 — c | cn | | Pt | | Reserved | | | | Max # Blocks | | | | |

Possible Name Field Layouts

FIG. 4f

|  | Name Device # | Request | Data Type |
|---|---|---|---|
| 0000 | C01 | Read | T5 |
| 0016 | C01 | Write | T1 |
| 0032 | C01 | Prefetch | T2 |
| 0048 | C02 | Read | T6 |
| 0064 | C02 | Write | T1 |
| 0080 | C02 | Prefetch | T2 |
| 0096 | C11 | Read | T7 |
| 0112 | C11 | Write | T1 |
| 0128 | C11 | Prefetch | T2 |
| 0144 | D09 | Read | T8 |
| 0160 | D09 | Write | T1 |
| 0176 | D09 | Prefetch | T3 |
| 0192 | E15 | Read | T10 |
| 0208 | E15 | Write | T1 |
| 0224 | E15 | Prefetch | T4 |
| 0240 | BC3 | Read | T10 |
| 0256 | BC3 | Write | T1 |
| 0272 | BC3 | Prefetch | T4 |
| 0288 | D01 | Read | T9 |
| 0304 | D01 | Write | T1 |
| 0320 | D01 | Prefetch | T3 |
| xxxx | 112 (12 bytes) | 114 (2 bytes) | 116 (2 bytes) |

Data Type typing table

Key to
*FIG. 6*

*FIG. 6a*

| Row # | control bits | | | | | | Pn DT | na* * * | Data Fields MB ca | NB | LF LF | LB LB | PF PF | 118 PB PB |
|---|---|---|---|---|---|---|---|---|---|---|---|---|---|---|
| | er | le | pe | ac | pz | ic | | | | | | | | |
| 0 | 0 | 0 | 1 | 0 | 0 | 0 | P0 | -- | 8 | 8 | 3 | 8 | 12 | -- |
| 1 | 0 | 0 | 1 | 0 | 0 | 0 | P1 | -- | 7 | 7 | 41 | 16 | 34 | 17 |
| 2 | 0 | 0 | 1 | 0 | 0 | 0 | P2 | -- | 3 | 3 | 15 | 13 | 29 | 45 |
| 3 | 0 | 0 | 1 | 0 | 0 | 0 | P3 | -- | 0 | 0 | 9 | 0 | 9 | 27 |
| 4 | 0 | 0 | 1 | 0 | 0 | 0 | P4 | -- | -- | -- | -- | -- | -- | -- |
| 5 | 0 | 0 | 1 | 0 | 0 | 0 | P5 | -- | -- | -- | -- | -- | -- | -- |
| 6 | 0 | 1 | 0 | 0 | 0 | 1 | 1 | name - 19 | 06 | 22 | 26 | 47 | 26 | |
| 7 | 1 | 0 | 0 | 0 | 0 | 0 | -- | -- | -- | -- | -- | -- | -- | |
| 8 | 0 | 1 | 0 | 0 | 1 | 1 | 1 | name - 08 | 02 | 0 | 24 | -- | -- | |
| 9 | 0 | 1 | 0 | 0 | 0 | 0 | 3 | name - 09 | -- | 34 | 3 | 39 | 3 | |
| 10 | 1 | 0 | 0 | 0 | 0 | 0 | -- | -- | -- | -- | -- | -- | -- | |
| 11 | 0 | 1 | 0 | 0 | 0 | 0 | 3 | name - 23 | -- | 16 | 46 | 27 | 22 | |
| 12 | 0 | 1 | 0 | 0 | 1 | 1 | 1 | name - 01 | 11 | 33 | 17 | -- | -- | |
| 13 | 0 | 1 | 0 | 0 | 0 | 1 | 2 | name - 14 | 01 | 2 | 39 | 15 | 31 | |
| 14 | 1 | 0 | 0 | 0 | 0 | 0 | -- | -- | -- | -- | -- | -- | -- | |
| 15 | 0 | 1 | 0 | 0 | 0 | 0 | 2 | name - 15 | -- | 18 | 2 | 41 | 13 | |
| 16 | 0 | 1 | 0 | 0 | 0 | 1 | 1 | name - 24 | 12 | 1 | 11 | 48 | 46 | |
| 17 | 0 | 1 | 0 | 0 | 0 | 0 | 1 | name - 29 | -- | 12 | 27 | 1 | 48 | |
| 18 | 0 | 1 | 0 | 0 | 0 | 1 | 1 | name - 16 | 07 | 35 | 15 | 26 | 34 | |
| 19 | 1 | 0 | 0 | 0 | 0 | 0 | -- | -- | -- | -- | -- | -- | -- | |
| 20 | 0 | 1 | 0 | 0 | 1 | 1 | 1 | name - 03 | 00 | 42 | 33 | -- | -- | |
| 21 | 1 | 0 | 0 | 0 | 0 | 0 | -- | -- | -- | -- | -- | -- | -- | |
| 22 | 0 | 1 | 0 | 0 | 0 | 0 | 3 | name - 20 | -- | 47 | 6 | 11 | 35 | |
| 23 | 1 | 0 | 0 | 0 | 0 | 0 | -- | -- | -- | -- | -- | -- | -- | |
| 24 | 0 | 1 | 0 | 0 | 1 | 1 | 2 | name - 07 | 03 | 8 | 37 | -- | -- | |
| 25 | 1 | 0 | 0 | 0 | 0 | 0 | -- | -- | -- | -- | -- | -- | -- | |

| | | | | | | | | | | | | |
|---|---|---|---|---|---|---|---|---|---|---|---|---|
| 26 | 0 | 1 | 0 | 0 | 0 | 1 | 1 | name − 18 | 17 | 6 | 35 | 6 | 18 |
| 27 | 0 | 1 | 0 | 0 | 0 | 0 | 3 | name − 28 | -- | 17 | 48 | 3 | 11 |
| 28 | 1 | 0 | 0 | 0 | 0 | 0 | -- | -- | -- | -- | -- | -- | -- |
| 29 | 0 | 1 | 0 | 0 | 0 | 1 | 2 | name − 11 | 13 | 31 | 34 | 31 | 2 |
| 30 | 1 | 0 | 0 | 0 | 0 | 0 | -- | -- | -- | -- | -- | -- | -- |
| 31 | 0 | 1 | 0 | 0 | 0 | 1 | 2 | name − 12 | 16 | 39 | 29 | 13 | 29 |
| 32 | 1 | 0 | 0 | 0 | 0 | 0 | -- | -- | -- | -- | -- | -- | -- |
| 33 | 0 | 1 | 0 | 0 | 1 | 1 | 2 | name − 02 | 04 | 20 | 12 | -- | -- |
| 34 | 0 | 1 | 0 | 0 | 0 | 1 | 1 | name − 10 | 10 | 29 | 9 | 18 | 1 |
| 35 | 0 | 1 | 0 | 0 | 0 | 0 | 3 | name − 17 | 14 | 26 | 18 | 22 | 39 |
| 36 | 1 | 0 | 0 | 0 | 0 | 0 | -- | -- | -- | -- | -- | -- | -- |
| 37 | 0 | 1 | 0 | 0 | 1 | 1 | 1 | name − 06 | 05 | 24 | 44 | -- | -- |
| 38 | 1 | 0 | 0 | 0 | 0 | 0 | -- | -- | -- | -- | -- | -- | -- |
| 39 | 0 | 1 | 0 | 0 | 0 | 0 | 3 | name − 13 | -- | 13 | 31 | 35 | 9 |
| 40 | 1 | 0 | 0 | 0 | 0 | 0 | -- | -- | -- | -- | -- | -- | -- |
| 41 | 0 | 1 | 0 | 0 | 0 | 0 | 2 | name − 25 | -- | 45 | 1 | 45 | 15 |
| 42 | 0 | 1 | 0 | 0 | 1 | 1 | 1 | name − 04 | 15 | 44 | 20 | -- | -- |
| 43 | 1 | 0 | 0 | 0 | 0 | 0 | -- | -- | -- | -- | -- | -- | -- |
| 44 | 0 | 1 | 0 | 0 | 1 | 1 | 2 | name − 05 | 09 | 37 | 42 | -- | -- |
| 45 | 0 | 1 | 0 | 0 | 0 | 0 | 2 | name − 26 | -- | 48 | 41 | 2 | 41 |
| 46 | 0 | 1 | 0 | 0 | 0 | 1 | 1 | name − 22 | -- | 11 | 47 | 16 | 47 |
| 47 | 0 | 1 | 0 | 0 | 0 | 1 | 1 | name − 21 | 08 | 46 | 22 | 46 | 6 |
| 48 | 0 | 1 | 0 | 0 | 0 | 0 | 1 | name − 27 | -- | 27 | 45 | 17 | 16 |
| 49 | 0 | 0 | 0 | 1 | 0 | 0 | -- | -- | -- | ** | 49 | 49 | -- | -- |
| | 14 | 29 | 6 | 1 | 8 | 18 | | | | | | | |

Sample Cache Directory Table

*FIG. 6b*

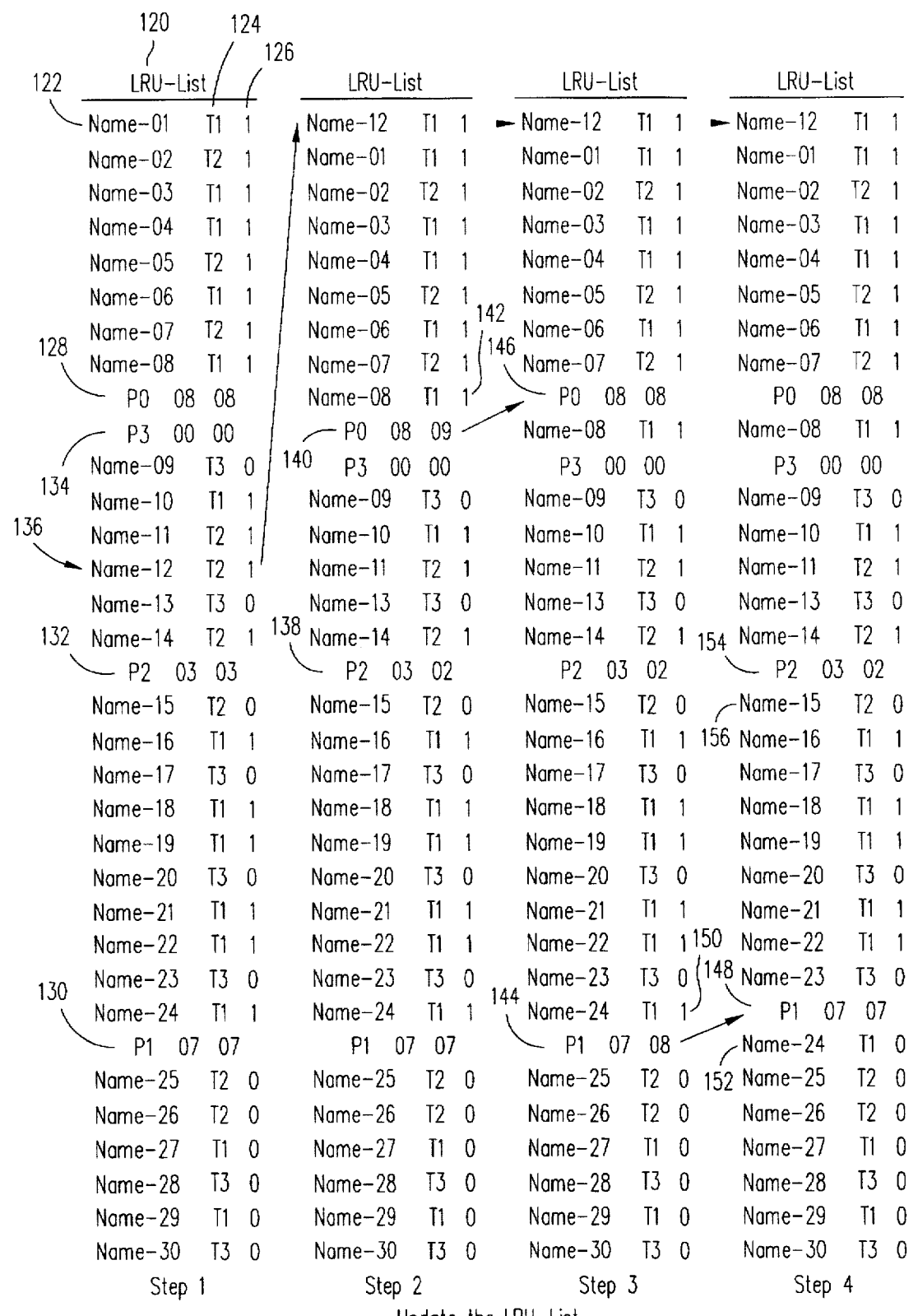
FIG. 7  Update the LRU-List

Key To FIG. 8

| Fig. 8a |
|---------|
| Fig. 8b |

FIG. 8a

LRU-List (170)

| Name-01 | T1 | 1 |
| Name-02 | T2 | 1 |
| Name-03 | T1 | 1 |
| Name-04 | T1 | 1 |
| P0 04 08 | | |
| Name-05 | T2 | 1 |
| Name-06 | T1 | 1 |
| Name-07 | T2 | 1 |
| Name-08 | T1 | 1 |
| P3 07 00 | | |
| Name-09 | T3 | 0 |
| Name-10 | T1 | 1 |
| Name-11 | T2 | 1 |
| Name-12 | T2 | 1 |
| Name-13 | T3 | 0 |
| Name-14 | T2 | 1 |
| P2 04 03 | | |

LRU-List

| Name-01 | T1 | 1 |
| Name-02 | T2 | 1 |
| Name-03 | T1 | 1 |
| Name-04 | T1 | 1 |
| P0 04 04 | | |
| Name-05 | T2 | 1 |
| Name-06 | T1 | 1 |
| Name-07 | T2 | 1 |
| Name-08 | T1 | 1 |
| P3 07 00 | | |
| Name-09 | T3 | 0 |
| Name-10 | T1 | 1 |
| Name-11 | T2 | 1 |
| Name-12 | T2 | 1 |
| Name-13 | T3 | 0 |
| Name-14 | T2 | 1 |
| P2 04 05 | | |

LRU-List

| Name-01 | T1 | 1 |
| Name-02 | T2 | 1 |
| Name-03 | T1 | 1 |
| Name-04 | T1 | 1 |
| P0 04 04 | | |
| Name-05 | T2 | 1 |
| Name-06 | T1 | 1 |
| Name-07 | T2 | 1 |
| Name-08 | T1 | 1 |
| P3 07 00 | | | (184)
| Name-09 | T3 | 0 |
| Name-10 | T1 | 1 |
| P1 03 03 | | |
| Name-11 | T2 | 1 |
| Name-12 | T2 | 1 |
| P2 04 04 | | |
| Name-13 | T3 | 0 |

LRU-List

| Name-01 | T1 | 1 |
| Name-02 | T2 | 1 |
| Name-03 | T1 | 1 |
| Name-04 | T1 | 1 |
| P0 04 04 | | |
| Name-05 | T2 | 1 |
| Name-06 | T1 | 1 |
| Name-07 | T2 | 1 |
| Name-08 | T1 | 1 |
| Name-09 | T3 | 1 |
| Name-10 | T1 | 1 |
| P1 03 03 | | |
| Name-11 | T2 | 1 |
| Name-12 | T2 | 1 |
| P2 04 04 | | |
| Name-13 | T3 | 1 |
| Name-14 | T2 | 0 |

Changing Partition Sizes

FIG. 9a

| LRU-List | | |
|---|---|---|
| Name-01 | T1 | 1 |
| Name-02 | T2 | 1 |
| Name-03 | T1 | 1 |
| Name-04 | T1 | 1 |
| Name-05 | T2 | 1 |
| Name-06 | T1 | 1 |
| Name-07 | T2 | 1 |
| Name-08 | T1 | 1 |
| P0 10 08 | T3 | 0 |
| P3 02 00 | | |
| Name-09 | T3 | 0 |
| Name-10 | T1 | 1 |
| Name-11 | T2 | 1 |
| Name-12 | T2 | 1 |
| Name-13 | T3 | 0 |
| Name-14 | T2 | 1 |
| P2 04 03 | | |

190 ↗ 196 ↗ 194 ↗

| LRU-List | | |
|---|---|---|
| Name-01 | T1 | 1 |
| Name-02 | T2 | 1 |
| Name-03 | T1 | 1 |
| Name-04 | T1 | 1 |
| Name-05 | T2 | 1 |
| Name-06 | T1 | 1 |
| Name-07 | T2 | 1 |
| Name-08 | T1 | 1 |
| Name-10 | T1 | 1 |
| Name-11 | T2 | 1 |
| P0 10 10 | | |
| P3 02 00 | | |
| Name-09 | T3 | 0 |
| Name-12 | T2 | 1 |
| Name-13 | T3 | 0 |
| Name-14 | T2 | 1 |
| P2 04 02 | | |

200  206

| LRU-List | | |
|---|---|---|
| Name-01 | T1 | 1 |
| Name-02 | T2 | 1 |
| Name-03 | T1 | 1 |
| Name-04 | T1 | 1 |
| Name-05 | T2 | 1 |
| Name-06 | T1 | 1 |
| Name-07 | T2 | 1 |
| Name-08 | T1 | 1 |
| Name-10 | T1 | 1 |
| Name-11 | T2 | 1 |
| P0 10 10 | | |
| P3 02 00 | | |
| Name-09 | T3 | 0 |
| Name-12 | T2 | 1 |
| Name-13 | T3 | 0 |
| Name-14 | T2 | 1 |
| Name-15 | T2 | 1 |

208

| LRU-List | | |
|---|---|---|
| Name-01 | T1 | 1 |
| Name-02 | T2 | 1 |
| Name-03 | T1 | 1 |
| Name-04 | T1 | 1 |
| Name-05 | T2 | 1 |
| Name-06 | T1 | 1 |
| Name-07 | T2 | 1 |
| Name-08 | T1 | 1 |
| Name-10 | T1 | 1 |
| Name-11 | T2 | 1 |
| P0 10 10 | | |
| Name-09 | T3 | 1 |
| Name-12 | T2 | 1 |
| Name-13 | T3 | 1 |
| P3 02 02 | | |
| Name-14 | T2 | 1 |
| Name-15 | T2 | 1 |

Key To FIG. 9

| Fig. 9a |
|---|
| Fig. 9b |

Changing Partition Sizes

METHOD FOR MANAGING A CACHE HIERARCHY HAVING A LEAST RECENTLY USED (LRU) GLOBAL CACHE AND A PLURALITY OF LRU DESTAGING LOCAL CACHES CONTAINING COUNTERPART DATATYPE PARTITIONS

This application is a continuation-in-part of application Ser. No. 07/327,204, filed Mar. 22, 1989, now abandoned.

FIELD OF THE INVENTION

This invention pertains to the efficient management of caches or buffer memories used between computer processors and larger main memories, e.g., a system storage hierarchy utilizing hard disk drives.

Cache memories are temporary storage devices for storing data with which the computer processors have high probability of working directly. The purpose of such temporary storage is to anticipate and stage data for fast access by the very high speed processors. The computer throughput is improved because the cache system can expeditiously transfer the data to a processor without waiting for the slower input/output (I/O) cycle between the main memories and the processors. The designs of the cache memories and the way they interface with the processors have significant impacts on the computer system performance. This invention particularly relates to the efficient management of a cache memory system by logically and dynamically configuring and/or reconfiguring the cache memory system into a plurality of interrelated subcaches to increase the probability that the processor requested data items will be found in the cache memory system.

BACKGROUND OF THE INVENTION

The placement and management of cache memories between one or more processors and one or more main storage devices such as hard disks are very common for high-speed sophisticated computer systems. It is well known that the performance of such computer systems is intimately related to the performance of the cache memories. The prior art shows various efforts to improve the cache memory performance. These efforts included the use of multi-level caches for hierarchical management, the use of separate caches for instruction and for data, the division of caches into many partitioned caches for parallel and simultaneous access by a plurality of processors, and many other methods for connecting the caches to the processors and different ways of managing the caches.

A major factor in measuring the performance of the cache management is the probability that the processor requested data item is found in the cache memories. A cache 'hit' or a 'miss' is registered depending on whether the requested data is found in one of the caches. It is therefore one of the objectives in designing a cache system to achieve high cache hit rate.

As a computer 'runs', the type of processes executed by a processor are continuously changing as a function of time. Meanwhile, as the processor executes different types of processes, the types of data required for those processes from the caches are also changing. One of the limitations of the typical prior art is that the caches are configured by a predetermined design and each cache is generally managed independently. Because the cache configurations are predetermined and fixed and oftentimes the cache management methods are fragmented, it is very difficult to dynamically and logically change the cache configurations and management schemes in response to the types of processes and the required data. Since the data requirements for the caches vary over time, these limitations may hinder a cache system to continuously maintain a high hit-rate performance.

The following pertinent patents represent the state of the art in managing cache memories with either 1) a hierarchical multi-level structure and/or 2) a partitioned cache configuration: U.S. Pat. No. 4,442,487 by Fletcher et al (Apr. 10, 1984) entitled "Three Level Memory Hierarchy Using Write and Share Flags", assigned to the same assignee as the present invention, describes a system of multiple caches between several processors and several storage devices. In this system of caches, each processor has its own local cache and there is one cache shared between all the processors.

Each block of data stored in the storage devices has a tag associated with it which marks that block as: 1) Read Only and Sharable; 2) Read Only and not Sharable; 3) Read/Write and Sharable; and 4) Read/Write and Not Sharable. When a process running on a processor requests access to a block of data and the tag associated with that block indicates that it is of type 1, 2, or 4 above, then that block of data is fetched into the local cache of that processor. On the other hand, if the tag on the block of data is of type 3 above, then that block of data is fetched into the cache shared by all the processors. This is illustrated in FIG. 1a with a single level cache. Additionally, all local and shared caches are split into two cache levels for better performance.

Although Fletcher's patent solves the "cross interrogation problem" that often occurs when more than one processor can update shared data, the cache system was managed in a fragmented fashion because a separate Least Recently Used (LRU)-List was maintained for each partition and a block of data can belong to only 1 of 4 types. Furthermore, because the data types stored in the caches were not identified, the cache management system did not provide a mechanism whereby some types of data blocks could be kept in the caches longer than other types in response to the more recent requests of that types of data by the central processing unit (CPU).

U.S. Pat. No. 4,463,424 by Mattson (Jul. 31, 1984) entitled "Method for Dynamically Allocating LRU/MRU Managed Memory Among Concurrent Sequential Processes" assigned to the same assignee as the present invention, describes a system with one shared cache between several processors and several storage devices In this regard, the acronym MRU refers to a cache list discipline of "most recently used". This cache is shared by from 1 to p processors executing from 1 to M concurrent processes, each operating on non-shared blocks of data. This cache organization is illustrated in FIG. 1b. This patent provides: 1) a method whereby each process can rapidly determine its hit ratio over its last requests for data as a function of cache space which might have been provided for it in the cache; 2) using known optimizations techniques, a method of allocating a specific amount of cache space to each process in the shared cache so that the total space allocated is equal to the total shared cache space and the overall hit ratio over the accumulated requests to the shared cache is maximized; and 3) constantly repeating (1) and (2) above so that the amount of space allocated to each process changes dynamically in an attempt to achieve higher over-all hit ratios than could be obtained from any fixed allocation of shared cache space to particular running processes.

The Mattson patent provides a separate LRU-List of block number and shared cache location and a separate available space list of empty shared cache locations for each process.

Furthermore, the replacement within a partition is based on the LRU List for that process and every process uses the most recently referenced entries in its LRU list to determine a hit to the shared cache, and a shared cache control is necessary to collect hit and miss data from each process and periodically reallocate shared cache space to each process. It is limited by the same difficulties as that was encountered in the Flecther's patent discussed above.

Reference should also be made to Brenza, U.S. Pat. No. 4,905,141, entitled "Partitioned Cache Memory With Partitioned Lookaside Table (PLAT) For Early Assignment Identification", issued Feb. 27, 1990, and assigned to the same assignee as the present invention, which describes a system with one shared cache between several processors and several storage devices. This cache is partitioned into M sub-caches. These M sub-caches are equally sized caches between one processor with a memory having M+1 ports for concurrently making requests to a storage device or devices. This cache organization is illustrated in FIG. 1c. Simultaneous cache accessing in up to M of the M different caches may be made by M processor requests if the request on each port i is found in the cache serving port i. If a miss is detected from any of the M port requests, that request is sent to every one of the M caches via port M+1. If this is also a miss, the block is requested from main storage and can be put into any one of the M caches. This allows for M-parallelism in accesses to the M caches.

The Brenza patent may be considered to be more flexible in allowing a data block to go into any one of the M caches. However, because a separate LRU list must be maintained for each partition and the replacement within a partition is based on the LRU List for that partition only, Brenza patent is also limited by the same difficulties as experienced by all the cache management systems where a fragmented cache control scheme is utilized.

U.S. Pat. No. 4,636,946 by Hartung et al. (Jan. 13, 1987) entitled "Method and Apparatus for Grouping Asynchronous Recording Operations", assigned to the same assignee as the present invention, describes a system with one cache between several processors (with memory) and several storage devices such as hard disks. This cache organization is illustrated in FIG. 1d. A single cache replacement control list is used to determine which block of data in the single cache should be replaced when space is needed in the cache, and additionally, which other blocks of data can be replaced at the same time to maximize the ratio of space made available to time required to make the space available. This is accomplished by implementing pointers into the LRU list which divide it into groups. The first group is scanned to find a block to replace. Then the first and second groups are scanned to find other blocks to replace along with this block. The third group is not scanned because this data is better kept in the cache to allow for additional cache hits before it is replaced.

The Hartung patent is similarly structured as that of Fletcher and Mattson because a single LRU List controls only one cache. Also, due to the fact that the pointers used to separate the LRU List into groups can only aid in determining which items are to be replaced as a set, no improvement of the hit ratio is accomplished by such methods.

U.S. Pat. No. 4,503,501 by Coulson et al (Mar. 5, 1985) entitled "Adaptive Domain Partitioning of Cache Memory Space", describes a system with one shared cache between several processors and several storage devices. This cache is partitioned into M sub-caches. These M sub-caches are called partitions P1, P2, . . . , PM. Partition P1 holds blocks of size B1, partition P2 holds blocks of size B2, . . . , and partition PM holds blocks of size BM, where B1, B2, . . . , BM are all different. As a further refinement, every sub-cache or partition is divided into fixed sized "domains" where each "domain" is large enough to store b1 blocks of size B1, or b2 blocks of size B2, . . . , or bM blocks of size BM. In this manner, there are D1 domains in partition P1 capable of holding a total of D1*b1 blocks of size B1, D2 domains in partition P2 capable of holding a total of D2*b2 blocks of size B2, . . . , and DM domains in partition PM capable of holding a total of DM*bM blocks of size BM. An example of this cache organization is shown in FIG. 1e with M=3, D1=2, D2=5, D3=3, B1=4, B2=3, B4=2, b1=3, b2=4, and B3=6.

Each sub-cache or partition is managed by maintaining an LRU List of blocks in that partition. When a block of size Bi is requested, the LRU List for partition Pi is examined to see if the block is present. If the block is in the list, the list entry gives the cache address of the block, the LRU List is updated to make the requested block the most recently referenced block and the cache controller sends the data to the requestor. If the requested block is not in the list, the cache controller uses the LRU entry in the list to determine the cache address of the data to be replaced with the requested block of data, and after replacement has occurred, the replaced block is removed from the LRU list and the LRU List is updated to make the requested block the most recently referenced block and the cache controller sends the data to the requestor.

The Coulson patent is again limited by managing the cache system in a fragmented manner in maintaining a separate LRU-List for each partition and using the LRU List for data replacement within a partition. This patent also disclosed that the number of domains in a given partition can be dynamically changed to make more efficient use of the cache.

However, dynamically changing a domain in Coulson involves the removal of all the data blocks in the domain from the cache in order to make the switch, which may result in sudden changes in performance. Furthermore, the domain switching algorithm tends to treat all DataTypes equally in that the ratio of partition stages to number of partition frames is the same for all data types (DataTypes). This method of partitioning is a 'minimum loss' rather than a 'maximum gain' method because there are no definitive correlations between the heuristic allocation of domains to each partition and the types of CPU processes requesting the cache data. The dynamic variation of cache partition alone may not result in hit ratio improvements.

OBJECTS OF THE INVENTION

Accordingly, one object of the present invention is to provide a new logical cache structure more likely to respond to the types of data which are processed and demanded by a CPU, therefore making the cache more efficient at producing cache hits.

Additionally, it is another object of the present invention to provide a means whereby a tag (DataType) is added to each block of data in the cache, the tag representing the type of data and/or the current use of the data, with a tag being added each time the data is requested from the cache manager and thus, the tag that is added may be different from one request to another.

Furthermore, it is another object of this invention to provide a means for logically partitioning the cache into M+1 sub-caches or partitions where M is an integer and some of the subcaches are implemented for storage of data records of specific DataType thus allowing some DataTypes to remain in the cache longer than other DataTypes.

Furthermore, it is another object of this invention to provide a means whereby all logical partitions of the cache are globally managed and controlled from a common data structure accessed by a single cache manager.

Furthermore, it is another object of this invention to provide a means whereby the partition sizes can be periodically reconfigured in an attempt to achieve higher hit ratios than could be obtained from a set of fixed partition sizes.

Furthermore, it is another object of this invention to provide a means whereby the partition sizes can be periodically reconfigured by altering a single data structure accessed by a single cache manager without having to move or alter any data actually stored in the cache, except for the possibility of having to push some data, which has been altered, out of the cache.

Furthermore, it is another object of this invention to provide a means whereby the cache manager, based on historical information, can "re-fetch" data that is not currently, but was previously, in the cache.

It is further an object of this invention to broaden the scope of the applications of the invention by replacing each "cache", "sub-cache", or "partition" mentioned in the background references or other literature with the "Partitioned Cache" of this invention. This substitution is easily achievable since each "cache", "sub-cache", or "partition" mentioned in the reference literature uses a single LRU-List for management and control of a single blocksize "cache", "sub-cache", or "partition" and, by changing that LRU-List to the LRU-List of this invention, each "cache", "sub-cache", or "partition" becomes a more efficient "Partitioned cache", "Partitioned sub-cache" or "Partitioned partition" which has the potential of producing a higher number of hits.

SUMMARY OF THE INVENTION

The objects of the invention are satisfied by making a logical subdivision of a cache memory array. The present invention teaches a cache management system for operation with at least one computer CPU. The cache management system is capable of fetching a plurality of data blocks from a system storage hierarchy for temporary storage and for rapidly transferring the data blocks to the CPU for processing. The cache management system comprises a cache array having a global partition and a plurality of DataType partitions. The global partition and DataType partitions have cache memory stores capable of storing a plurality of data blocks. The cache management system further has a cache manager which is capable of receiving a data memory request from the CPU requesting a read or write operation of at least one data block. The cache manager further has a cache manager memory, and the cache manager memory has a cache manager directory and a DataType Table. The cache manager directory comprises a plurality of data entries wherein each data entry is indicative of a data block name, a data block DataType, a cache array address of a data block, a pointer pointing to the cache array address of a more recently used data block, a pointer pointing to another data entry in the cache manager directory reflecting the relative positioning of the data entry in the directory, an address of an available cache array space, a maximum number of data blocks for a cache partition, and a status control data item. The DataType table has a plurality of DataType entries wherein each DataType entry comprises a data block category name and a DataType identifier. The data memory manager further has a cache management means whereby upon receipt of a data memory request from the CPU, the management means executes the memory request for the CPU and updates the cache manager directory. The cache management means further examines the DataType table and moves the data blocks in and out of the global and the DataType partitions in the cache array in accordance with the DataTypes. The present invention teaches a cache manager which manages the cache system by use of a single cache manager directory to maintain a logically partitioned cache. The cache memory is maintained to have an integrated configuration and therefore is capable of achieving a close to optimal cache management efficiency.

An additional feature of this invention is the ability of the cache manager to "re-fetch" blocks of data that are not currently in the cache, but have previously been in the cache, because there is a reasonable probability that the "re-fetched" block will be requested in the near future. This re-fetch is possible because the cache manager has access to the recent history of block accesses and from this history it can determine that it is more likely for a block that is not in the cache to be requested than it is for a block that is in the cache to be requested. When this situation occurs, the cache manager can force out the undesired block and re-fetch the desired block.

BRIEF DESCRIPTION OF THE DRAWINGS

FIGS. 4a to 4f show the designs of a cache management system according to the present invention, more particularly;

FIG. 4a is a schematic illustration of the physical storage necessary to hold the cache directory which is used by the cache manager for subsystem cache management, the physical storage being organized as a table with rows and columns.

FIG. 4b is a schematic illustration showing the details of a LRU-List-Entry row in the cache directory table referring to data items in the cache array.

FIG. 4c is a schematic illustration showing the details of a Partition-Entry row in the cache directory table referring to partitions of the cache array.

FIG. 4d is a schematic illustration showing the details of an Available-Space-Entry row in the cache directory table referring to empty cache array locations.

FIG. 4e is a schematic illustration showing the details of the control field in the rows of the cache directory table.

FIG. 4f is a schematic illustration showing some possible ways of using the name field in an LRU-List-Entry and a Partition-Entry.

FIG. 5 is a schematic illustration showing the possible use of a data type table to dynamically assign DataTypes to requested blocks of data for the present invention.

FIG. 6 is a schematic illustration of the cache directory table as set forth in this invention with entries in the table used to illustrate a particular partitioned cache organization and LRU order among the blocks in the cache array for the present invention.

FIG. 7 is a schematic illustration of steps required to update an LRU-List after a block is requested by a host process implemented in the present invention.

DESCRIPTION OF THE PREFERRED EMBODIMENT

Figure 1A:
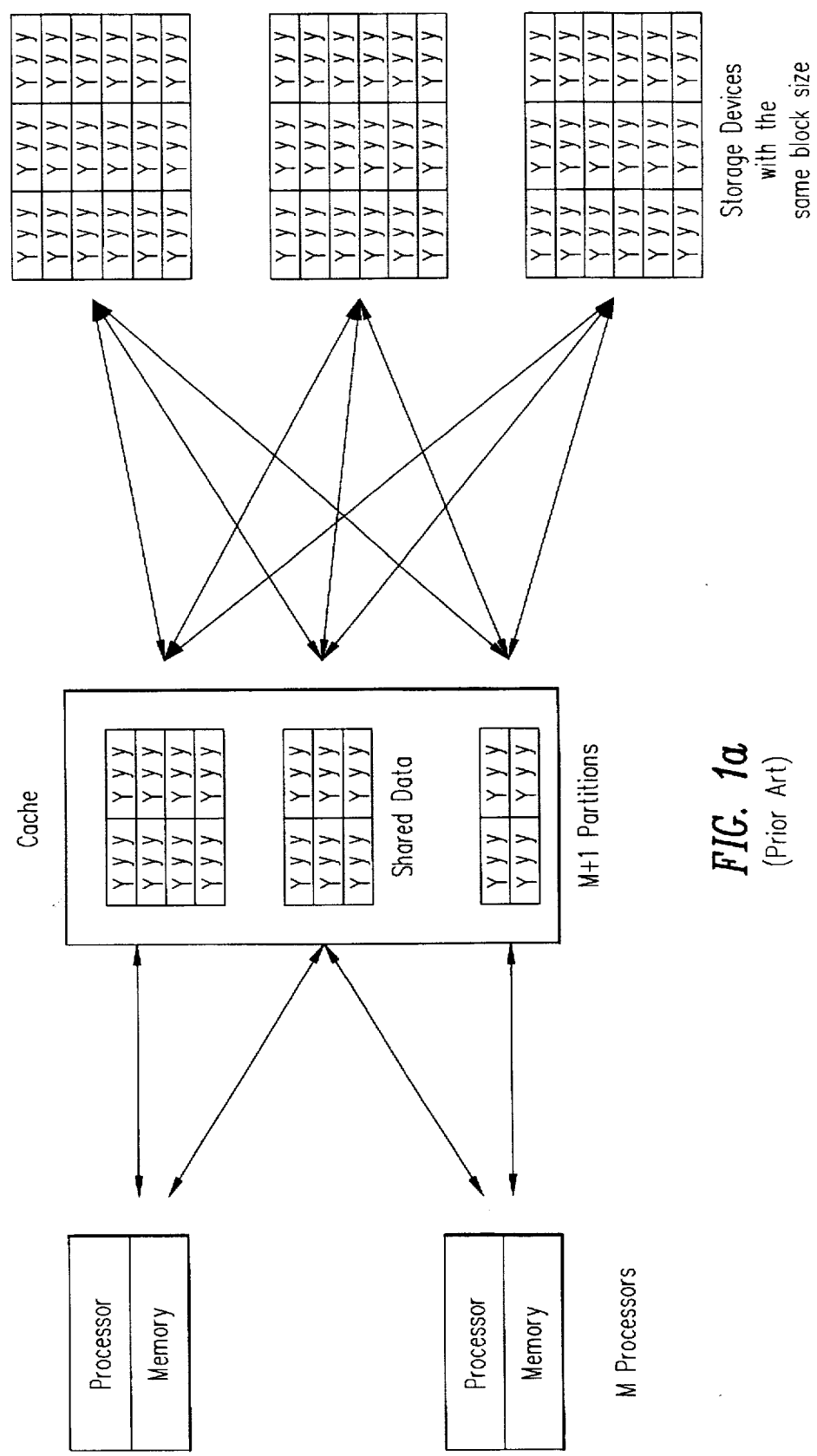
FIG. 1a is a schematic illustration of a prior art cache organization as set forth in U.S. Pat. No. 4,442,487 to Fletcher et al (issued Apr. 10, 1984).
Figure 1B:
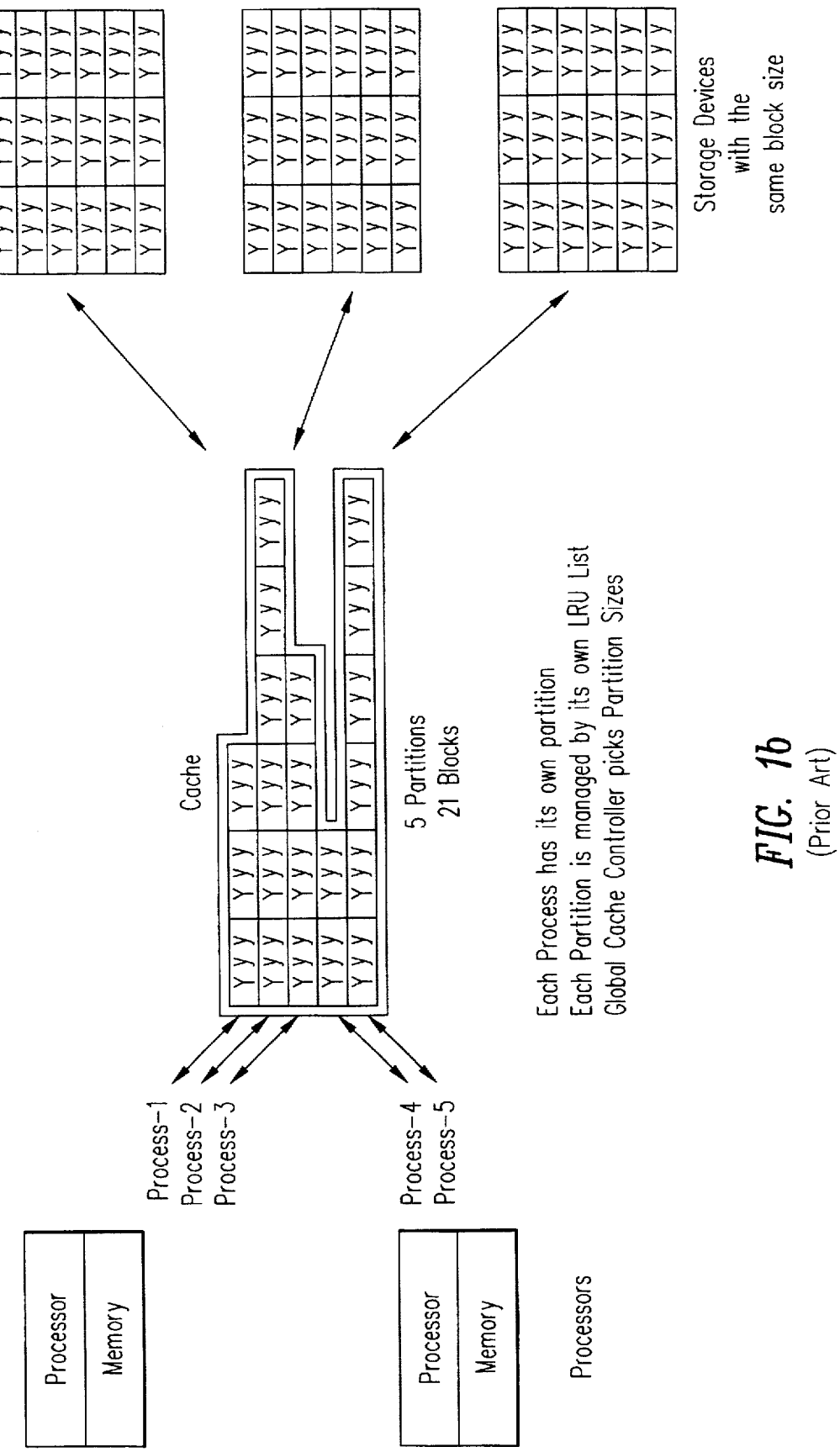
FIG. 1b is a schematic illustration of a prior art cache organization as set forth in U.S. Pat. No. 4,463,424 to Mattson (issued Aug. 31, 1984).
Figure 1C:
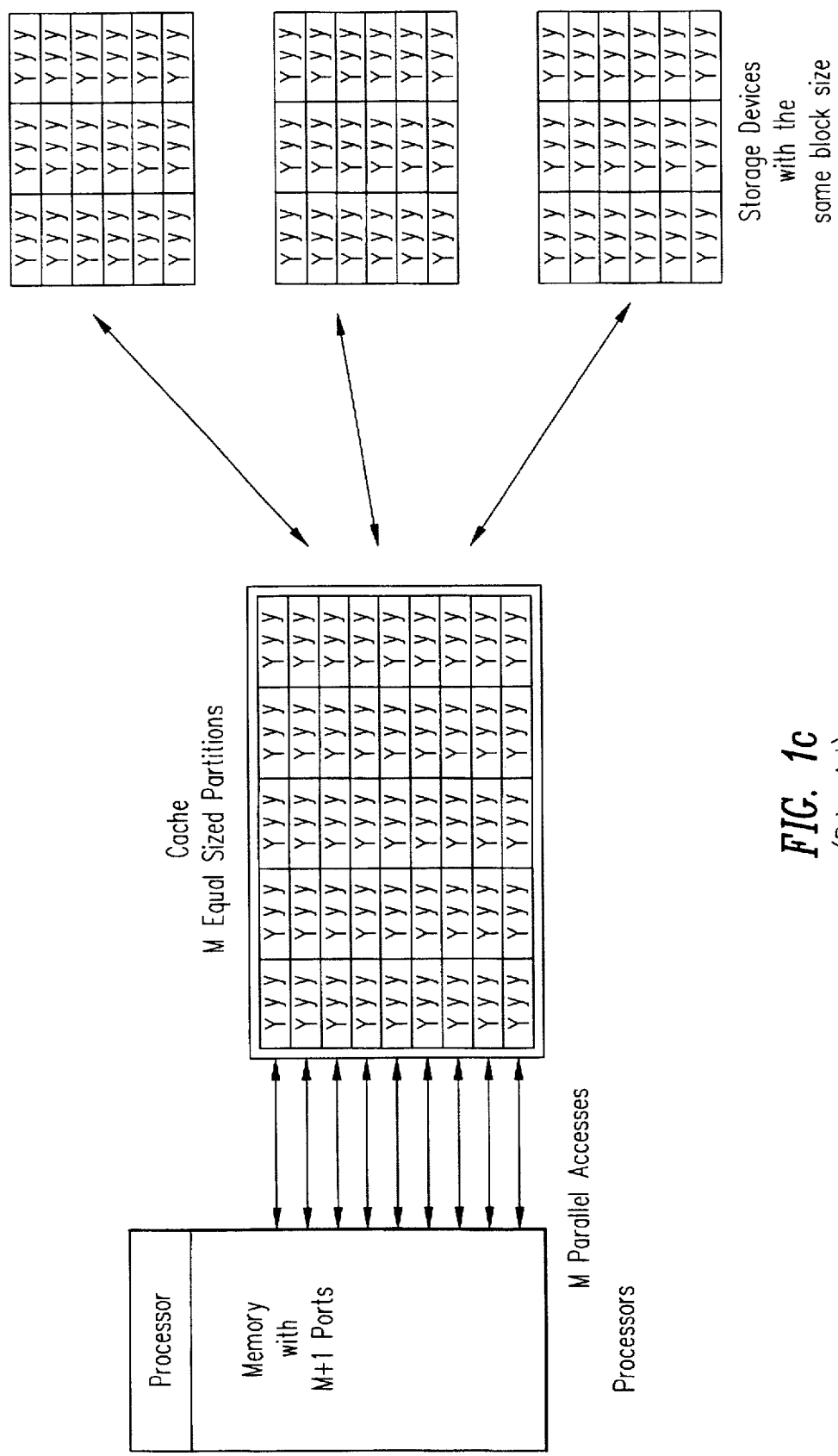
FIG. 1c is a schematic illustration of a prior art cache organization as set forth in U.S. Pat. No. 4,905,141 to Brenza (issued Feb. 27, 1990).
Figure 1D:
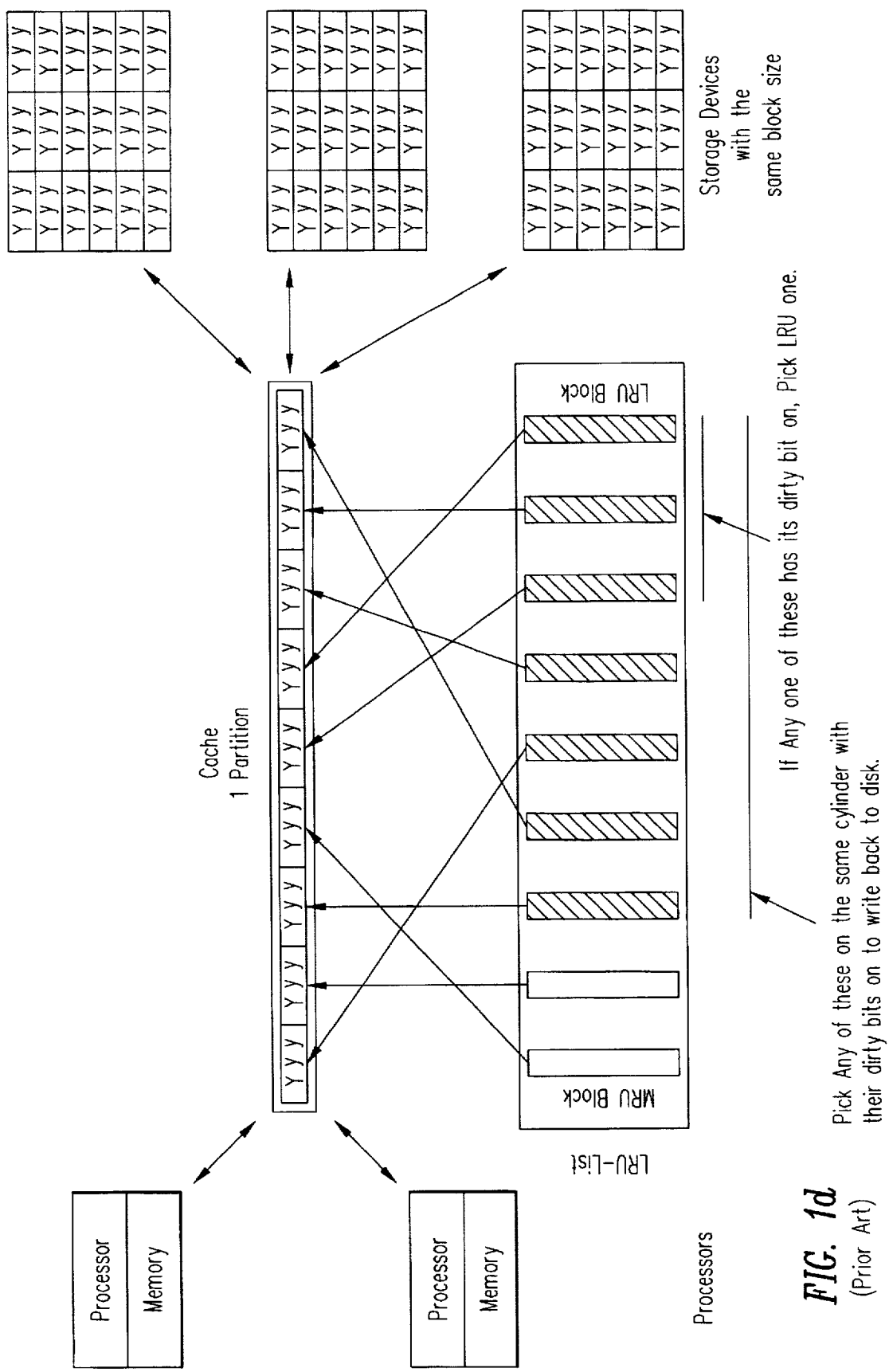
FIG. 1d is a schematic illustration of a prior art cache organization as set forth in U.S. Pat. No. 4,636,946 to Hartung et al. (issued Jan. 13, 1987).
Figure 1E:
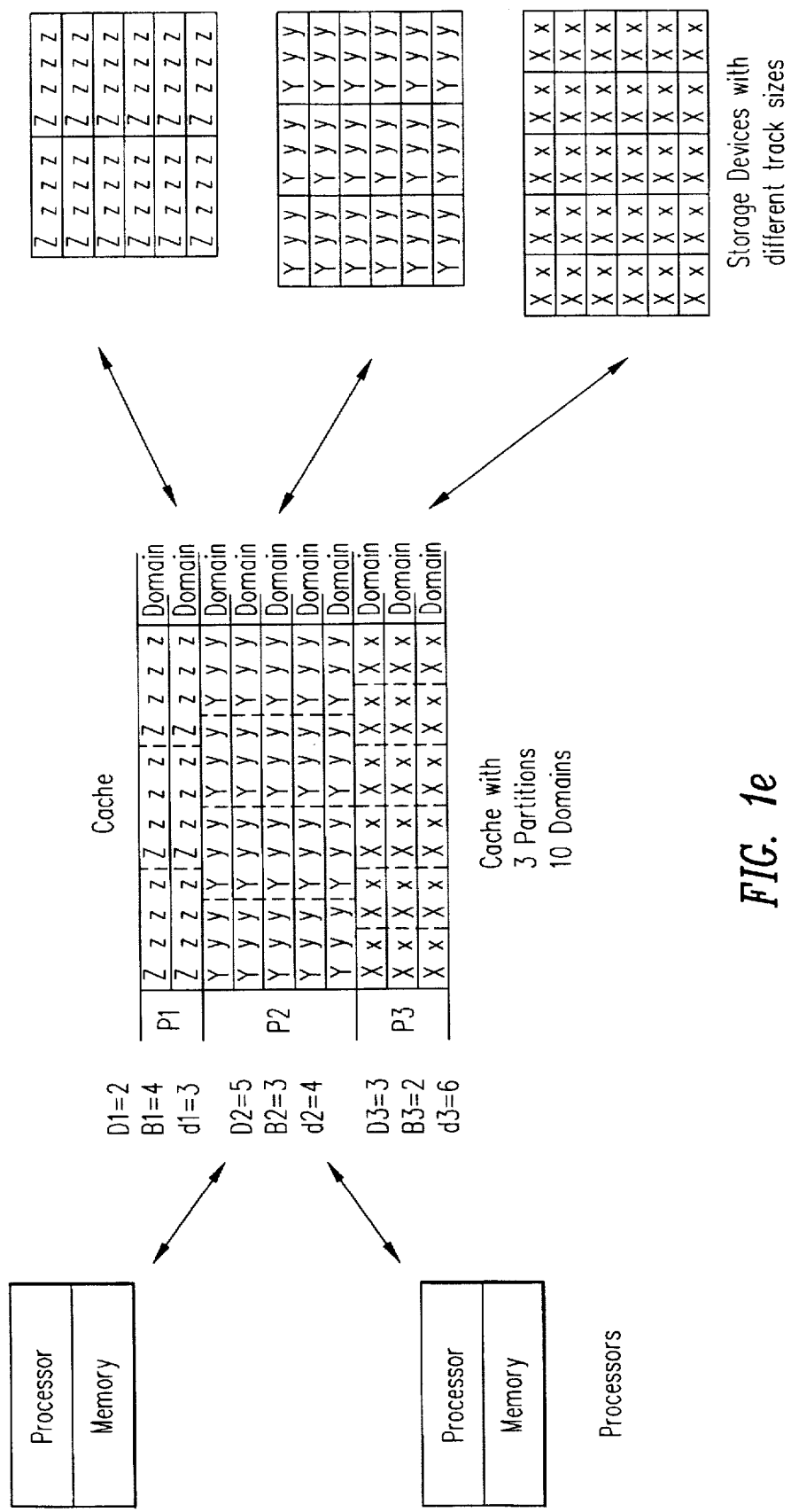
FIG. 1e is a schematic illustration of a prior art cache organization as set forth in U.S. Pat. No. 4,503,501 to Coulson et al (issued Mar. 5, 1985).
Figure 2:
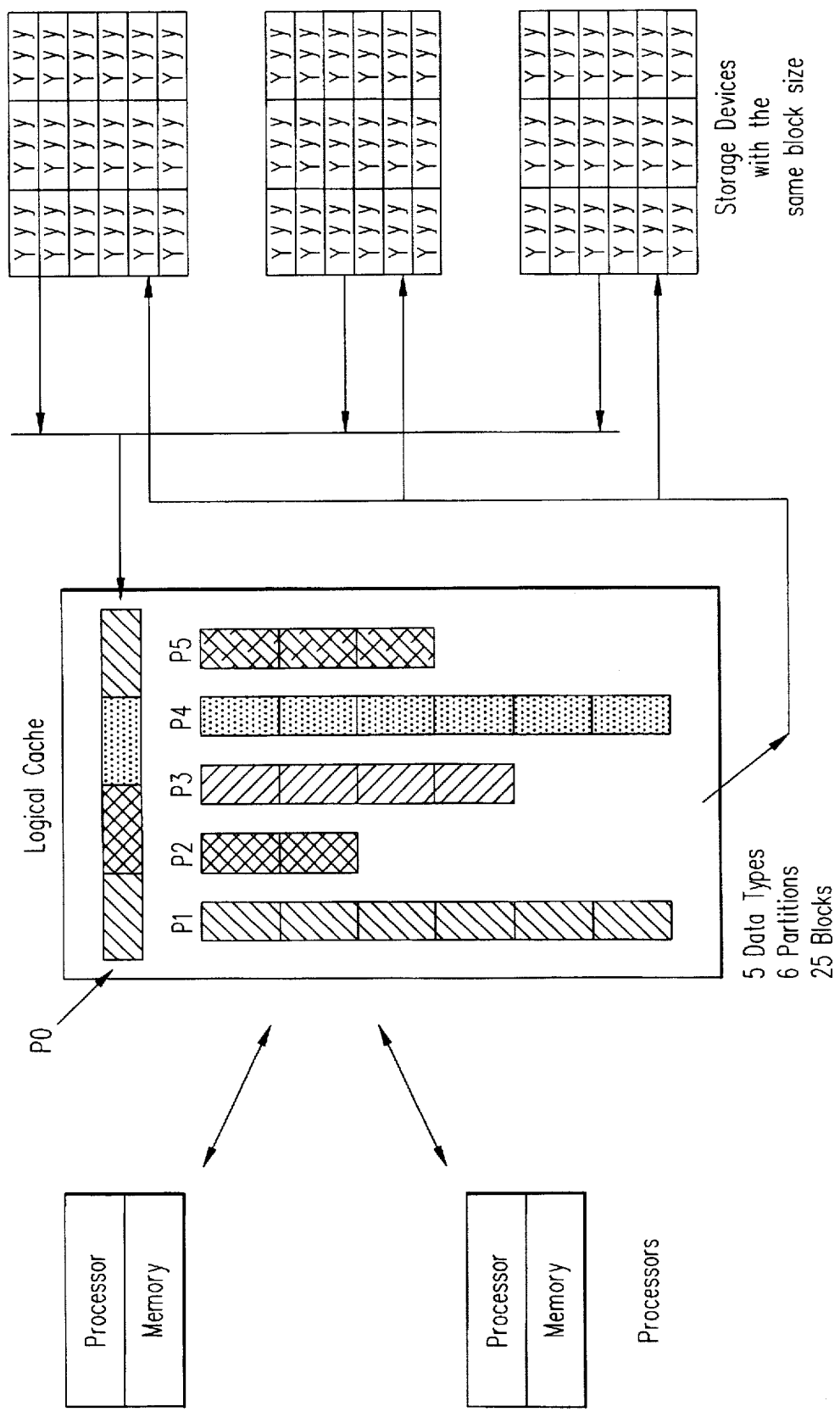
FIG. 2 is a schematic illustration of a cache organization according to the present invention.
Figure 3:
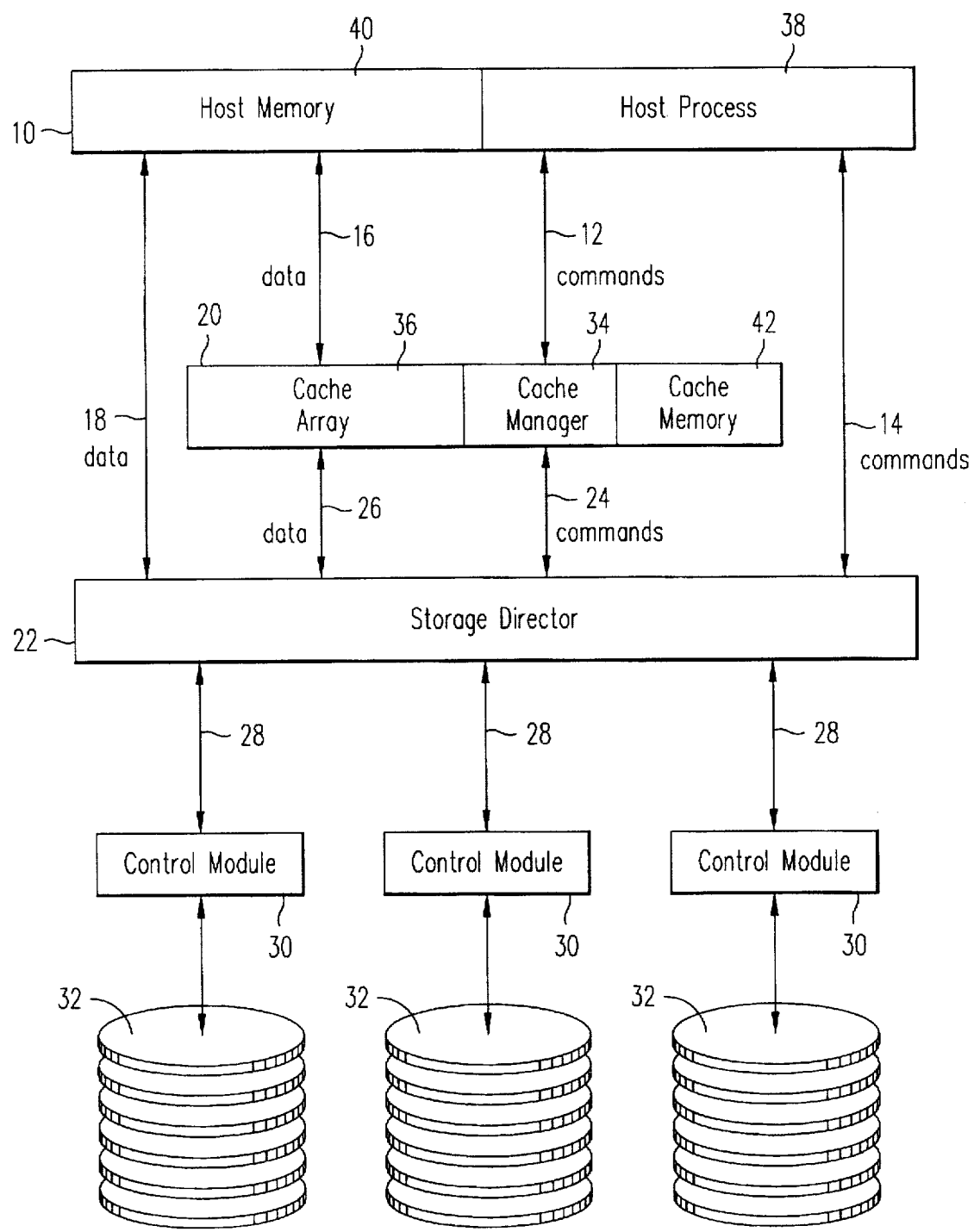
FIG. 3 is a schematic illustration of a cache memory subsystem which shows the interaction of the subsystem with processes running on the host processor and a disk subsystem for the present invention.

The objects of the invention are satisfied by logically subdividing a solid-state memory into one global partition and a plurality of DataType partitions, i.e., M partitions, each capable of holding an integer number of blocks of data where each block is of the same size. The sum of all the blocks in all the partitions is the total number of blocks that can be stored in the cache. The size of each partition, i.e., the number of blocks in each partition, is determined by an analysis process external to this invention whereby it is determined that such a partitioning is likely to produce equal to or higher hit ratios than could be produced by any of the cache schemes referenced in the background or other literature. A schematic illustration of a cache organization as set forth according to the present invention is shown in FIGS. 2 and 3.

When a block of data is requested by a process running on one or more of several processors, it is assigned 1 of M DataTypes by the cache manager. As a first example, blocks of data may come from 1 of M different disks. The cache manager for a disk cache would tag each requested block as T1, T2, . . . , TM, according to which disk it came from. As a second example, blocks of data may come into a buffer pool in main memory from disks storing many tables in a database system. The database bufferpool manager may tag any block containing data from a table used to index into another table containing information as Type 1, T1, data, and it may tag any block containing data from a table used to store only information as Type 2, T2, data. As a last example, the cache manager for a disk cache gets READ requests for blocks of data that are immediately needed by an application and the cache manager tags them as Type 1, T1, data. The cache manager also gets requests from an application to pre-fetch blocks into the cache because the application may need them in the future and the cache manager tags them as Type 2, T2, data. The cache manager also gets requests to write into a block of data. The data that is in the cache and has been modified will have to be written back to disk, but this write can be deferred as in the Hartung patent above and the cache manager can tag these blocks as Type 3, T3, data.

Partition 0, P0, of the M+1 cache partitions is assigned to storage of blocks of all DataTypes and each other partitions, P1, P2, . . . , PM are assigned to storage of blocks of only one DataType, T1, T2, . . . , TM respectively. When an application requests a block of data, B, the cache manager must find B, tag B with a DataType, Tb, make room for it in partition P0 of the cache, and make it the Most Recently Used block in P0. There are several cases to consider to summarize the cache manager operations, but IN ALL CASES the entry for B in the LRU-List shows where B is stored in the cache. If the request is a WRITE, then the data can be overwritten, and the dirty bit in the LRU-List entry turned on. If the request is a READ then the data can be transferred to the requestor. For both READ and WRITE requests the current type, Tb, is stored in the LRU-List entry, and B is made the Most Recently Used, MRU, block in partition P0.

Case 1 (a cache hit) is if the cache manager finds an entry for B in the LRU-List and determines that Block B is at cache location L and is in partition P0, then the cache manager makes B the MRU entry in P0 by moving the entry for B in the LRU-List from its current position to the top of the LRU-List and block B must be either sent to the requester or received from the requester and written into location L with a corresponding setting of the dirty bit.

Case 2 (a cache hit) is if the cache manager finds an entry for B in the LRU-List and determines that B is at cache location L and is in partition Pa (Pa not=P0). Then the cache manager logically moves (the block B in the cache is not moved) B from Pa to P0 by removing the entry for B in the LRU-List from its current position and moving it to the top of the LRU-List. This will effectively increase the number of blocks in P0 by one and decrease the number of blocks in Pa by one. If P0 was not full the cache manager is done with the LRU-List and block B must be either sent to the requester or received from the requester and written into location L with a corresponding setting of the dirty bit. However, if P0 was full, then P0 has one too many blocks in it and the cache manager must determine which block, block C, is the LRU block in P0 and logically remove C from P0 and decrease the number of blocks in P0 by one. If the LRU-List entry for block C indicates that C had DataType Tc, then the cache manager must logically make C the MRU block in Pc and increase the number of blocks in Pc by one. If Pc was not full then the cache manager is done with the LRU-List, but if Pc was full then Pc has one too many blocks in it and the cache manager must determine which block, block D, is the LRU block in Pc and logically remove D from Pc and decrease the number of blocks in Pc by one. If the entry for D in the LRU-List had the dirty bit turned on then the cache manager must write the data in that cache location to disk, turn off the dirty bit, and mark the location as empty. Block B must then be either sent to the requester or received from the requester and written into location L with a corresponding setting of its dirty bit.

Case 3 (a cache miss) is if the cache manager does not find an entry for B in the LRU-List or finds an entry for B but that entry indicates that B is not in the cache, then an entry for B must be created and put at the top of the LRU-List making it the MRU block in P0. Also the number of blocks in P0 must be increased by one. If P0 was not full the cache manager must find an empty block location, L, in the cache, assign it to store block B, and block B must be either read into location L from storage or written into location L from a processor with a corresponding setting of the dirty bit.

Continuing with case 3, if P0 was full, then P0 has one too many blocks in it and the cache manager must determine which block, block C, is the LRU block in P0 and logically remove C from P0 and decrease the number of blocks in P0 by one. If the LRU-List entry for block C indicates that C had DataType Tc, then the cache manager must logically make C the MRU block in Pc and increase the number of blocks in Pc by one. If Pc was not full then the cache manager must find an empty block location, L, in the cache, assign it to store block B, move block B from disk to location L, and block B must be either read into location L from storage or written into location L from a processor with a corresponding setting of the dirty bit.

Still continuing with case 3, if Pc was full then Pc has one too many blocks in it and the cache manager must determine which block, block D, is the LRU block in Pc and logically remove D from Pc and decrease the number of blocks in Pc by one. If the entry for D in the LRU-List had the dirty bit turned on then the cache manager must find cache location L that stores D, write the data at cache location L to disk, turn off the dirty bit, and mark location L as an empty block location. The cache manager must find an empty block location, L, in the cache and assign it to store block B. Block B must be either read into location L from storage or written into location L from a processor with a corresponding setting of the dirty bit.

When the cache manager is instructed to change the partition sizes it must take the following actions assuming P0 is full. If P0 is to be made smaller by K0 blocks, the cache manager must move K0 blocks from P0 to the other partitions and decrease the number of blocks in P0 by K0. The DataType of each block in the set K0 determines into which partition it must be put. If K1 of them go to P1, then the number of blocks in P1 needs to be increased by K1, etc. If P0 is to be made larger by K0 blocks, the cache manager must move K0 blocks from the other partitions to P0 and increase the number of blocks in P0 by K0. The blocks selected from the other partitions must be carefully done so that all the blocks that logically end up in P0 are more recently referenced than any block remaining in one of the other partitions. Again if K1 blocks logically move from P1 to P0 then the number of blocks in P1 must be decreased by K1, etc. If any partition P1, P2, . . . , PM has too many blocks in it, for example if Pb has Kb too many blocks in it, then the Kb LRU blocks in Pb must be removed from the cache by: writing the corresponding data to disk if the dirty bit is turned on; marking the entry not in cache; and marking the cache locations as empty.

In this way partition sizes can be changed at predetermined times in an attempt to maximize the number of hits to a cache.

It should be noted that, in all of the above cases, when the desired size of P0 is zero, the "Partitioned Cache" of this invention becomes similar to other partitioned caches in the literature, and the new management methods proposed for this invention can be used to manage those caches. It should also be noted that any cache in the literature that is managed from a single LRU-List can easily be changed to the "Partitioned-Cache" of this invention with the obvious advantages.

As discussed above, the logical partitioning, the periodic changing of partition sizes, the dynamic categorization of blocks of data into disjoint DataTypes, the ability to "refetch" old data blocks, and the control of all the above by a single cache manager operating on two tables (a table to store an LRU-List with embedded control entries, and a table to store how the cache manager should assign DataTypes to blocks of data) stored in memory used by the cache manager, are all designed to be used in a solid-state cache memory subsystem operating to contain data permanently stored on disk memory in anticipation of its being requested by a process running on a host computer. The cache memory subsystem may either be separate from a host computer having its own processor and memory, or a task running in a host computer like the bufferpool manager in many database systems.

Referring to FIG. 3, the host computer 10 is connected by suitable interfaces for commands 12, 14 and data 16, 18 to both the cache memory subsystem 20 and the storage director 22. In a similar manner, the cache memory subsystem 20 is connected by suitable interfaces for commands 24 and data 26 to the storage director 22. The storage director is connected by suitable interfaces 28 to plural control modules 30 which themselves control disk drives 32 in which some data is stored in blocks of a fixed size. When a decision is made by a cache manager 34 that it would be desirable to store a block of data (currently stored on disk 32) in cache array memory 36, contiguous byte locations in the cache array memory 36, sufficient to hold one block of data, must be assigned to receive the block of data and the operation proceeds. The cache array memory 36 is "framed" to hold blocks of data, thus facilitating the addressing to the cache array memory 36 to address block 0, block 1, . . . , block N.

Still referring to FIG. 3, when a host process 38 requests the cache manager 34 (via a command on interface 12) to move a block of data from cache array 36 to host memory 40, the cache manager 34 examines a "list" stored in cache memory 42 to see if the block of data is already in cache array memory 36. If the requested block is present in cache array 36, a "cache hit" occurs and cache manager 34 causes the desired block to be moved over interface 16 from the cache array 36 to the host memory 40. However, if the requested block is not in cache array 36, then a "cache miss" occurs and the cache manager must make room for the requested block in the cache array 36 and send a command over interface 24 to cause the storage director 22 to move the requested block from disk 32 to the proper location in the cache array 36 via interface 26. Once the block is in the cache array 36, the cache manager 34 must update the "list" in memory 42 to indicate that the requested block is in cache array 36 and its address in cache array 36, then the cache manager 34 causes the desired block to be moved over interface 16 from the cache array 36 to the host memory 40.

Those skilled in the art will recognize this as a familiar scenario and will be familiar with similar scenario's when the host process 38 requests that a block of data be written or moved from host memory 40 to cache array 36, and eventually to disk 32.

Again referring to FIG. 3, the present invention is concerned with five operations performed by the cache manager.
1) In response to a request from a process external to this invention, such as system start up, the cache manager can logically partition the storage space in the cache array 36 into M+1 subportions, sub-caches, or "partitions" P0, P1, . . . , PM, with each partition able to store C0 blocks, C1 blocks, . . . , and CM blocks respectively, where C0+C1+ C2+ . . . +CM equals the total number of blocks that can be stored in the cache array 36. The cache manager 34 can achieve this logical partitioning of cache array 36 by initializing certain entries in a Table 2 (see FIGS. 4a–4f) stored in memory 42. 2) As each write or read request from host process(s) 38 is received by the cache manager 34, the cache manager assigns 1 of M possible DataTypes to the requested block. Over time the same block of data may be assigned different DataTypes according to who (which process 38) made the request, what data was requested, or why the data was requested, the information being provided by the host process 38. The cache manager 34 determines the DataType to assign to each block of data by consulting a Table 1 (FIG. 5) stored in memory 42. 3) In response to a sequence of requests from process(s) 38 running on host processor(s) 10, the cache manager 34 can cause blocks to logically "flow through" the cache array 36 in a novel manner that can increase the number of hits to the cache by allowing blocks belonging to all DataTypes to be treated equally (by sharing the use of one partition) as long as they are "young" or frequently re-referenced, and then forcing each block into its own partition, according to its DataType, as they "age" or have not been referenced for a long time, so that blocks belonging to certain DataTypes will remain in the cache longer than blocks belonging to other DataTypes. The cache manager 34 can achieve this logical "block flow" in cache array 36 by updating certain entries in a Table 2 (see FIGS. 4a–4f) stored in memory 42. 4) In response to requests from a process external to this invention, the cache manager 34 can periodically change the number of logical partitions and sizes of the logical partitions in the cache array 36 (so that a higher number of hits to the cache array 36 can be obtained than could be obtained with any fixed set of partition sizes). The cache manager can be changing the partition sizes concurrently with performing its normal operation. The cache manager 34 can achieve this dynamic logical partition size change in the cache array 36 by updating certain entries in a Table 2 (FIGS. 4a–4f) stored in memory 42. 5) In response to the availability of space in the cache array 36 and a set of pre-determined rules provided by a process external to this invention, the cache manager 34 can or cannot "re-fetch" blocks of data that are currently not in the cache array 36, but were previously in cache array 36, because they have a high probability of being requested by a process 38 running on the host processor 10. The cache manager 34 can determine which blocks to "re-fetch" by referring to historical entries in a Table 2 (FIGS. 4a–4f) stored in memory 42.

In order to better understand the operation of this invention it is necessary to first describe the "cache directory", or Table 2, that the cache manager 34 uses to control the logical partitioning of the cache array memory 36. FIGS. 4a–4f depict the preferred embodiment of the cache directory as a table which is stored in the cache manager memory 42. This cache directory contains two doubly linked lists. The first double linked list refers to a least recently used list (LRU List) of blocks of data and their associated DataType, status, and control information currently residing in the cache. The second double linked list is an available space list of empty block locations in the cache array.

Figure 4A:
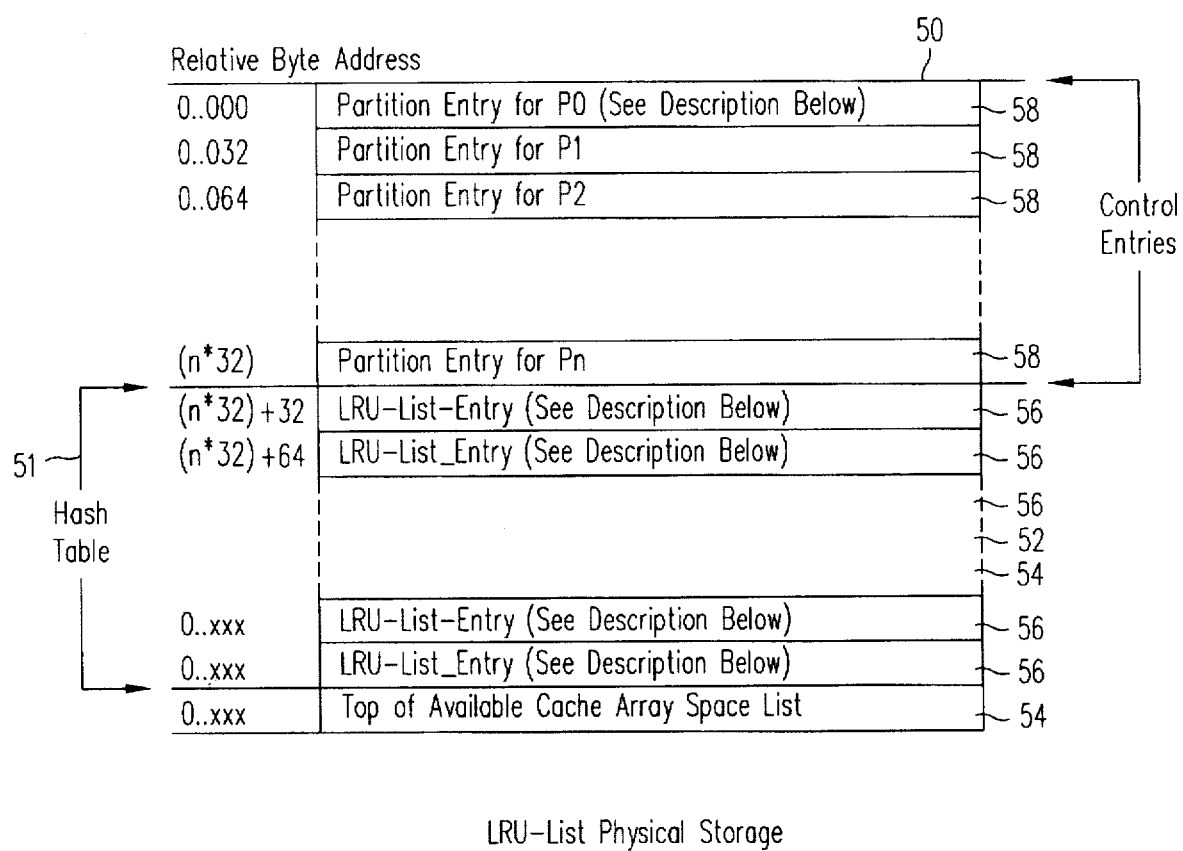

Referring to FIG. 4a, the preferred embodiment of the cache directory 50 is stored as a table with plural 32-byte rows, each of which contains information about the blocks of data stored in the cache array. FIG. 4a shows there are four types of rows, Empty Rows (er) 52, LRU List Entry rows (le) 56, Partition Entry rows (pe) 58, and Available Cache Array Space rows (av) 54. An Empty Row (er) can become either a LRU List Entry (le) row or an Available Cache Array Space (av) row and, in a similar manner, (le)'s and (av)'s can become (er)'s.

FIG. 4b exemplifies the 32-byte row that make up each LRU-List-Entry 56. The first two bytes, bytes 00–01, (cn) 60 contain 16 bits of status/control information which is described more fully with respect to FIG. 4e. The next two bytes, bytes 02–03, (DT) 61 are used to tag a block of data in the cache array as currently belonging to a particular DataType.

The next eight bytes, bytes 04–11, (na) 62 are used to store a "name" for a requested block. Two examples of such names are given in FIG. 4f. The next four bytes, bytes 12–15, (ca) 63 are used to store a cache array address for a block of data. The next four bytes, bytes 16–19, (LF) 64 are used as an LRU-List forward pointer and store the row number (of a row in the cache directory table 50) of the next entry, after the current entry, toward the bottom of the LRU-List. The next four bytes, bytes 20–23, (LB) 65 are used as an LRU-List backward pointer and store the row number (of a row in the cache directory table 50) of the next entry, before the current entry, toward the top of the LRU-List. The next four bytes, bytes 24–27, (PF) 66 are used as a Partition-List forward pointer and stores the row number (of a row in the cache directory table 50) of the next entry, after the current entry, toward the bottom of a Partition-List. The next four bytes, bytes 28–31, (PB) 67 are used as a Partition-List backward pointer and store the row number (of a row in the cache directory table 50) of the next entry, before the current entry, toward the top of the Partition-List.

FIG. 4c shows the 32-byte row that makes up each Partition-Entry 58. The first two bytes, bytes 00–01, (cn) 60 contain 16 bits of status/control information which is described more fully with respect to FIG. 4e. The next two bytes, bytes 02–03, (PN) 68 are used as partition name P0, P1, P2, . . . , or Pn. The next four bytes, bytes 04–07 are reserved. The next four bytes, bytes 08–11, (MB) 69 are used to store the maximum number of blocks that can be stored in this partition of the cache array 36. The next four bytes, bytes 12–15, (NB) 70 are used to store the number of blocks that are currently stored in this partition of the cache array 36. The next four bytes, bytes 16–19, (LF) 64 are used as an LRU-List forward pointer and store the row number (of a row in the cache directory table 50) of the next entry, after the current entry, toward the bottom of the LRU-List. The next four bytes, bytes 20–23, (LB) 65 are used as an LRU list backward pointer and store the row number (of a row in the cache directory table 50) of the next entry, before the current entry, toward the top of the LRU-List. The next four bytes, bytes 24–27, (PF) 66 are used as a Partition-List forward pointer and store the row number (of a row in the cache directory table 50) of the next entry, after the current entry, toward the bottom of a Partition-List. The next four bytes, bytes 28–31, (PB) 67 are used as a Partition-List backward pointer and store the row number (of a row in the cache directory table 50) of the next entry, before the current entry, toward the top of the Partition-List.

FIG. 4d exemplifies the 32-byte row that makes up each Available-Cache-Array-Space row 54. The first two bytes, bytes 00–01, (cn) 60 contain 16 bits of status/control information which is described more fully with respect to FIG. 4e. The next ten bytes, bytes 02–11, are not used. The next four bytes, bytes 12–15, (ca) 63 are used to store a cache array address for a block of data. The next four bytes, bytes 16–19, (AF) 71 are used as an Available-Space-List forward pointer and store the row number (of a row in the cache directory table 50) of the next entry, after the current entry, toward the bottom of the Available-Space-List. The next four bytes, bytes 20–23, (AB) 72 are used as an Available-Space-List backward pointer and store the row number (of a row in the cache directory table 50) of the next entry, before the current entry, toward the top of the Available-Space-List. The next eight bytes, bytes 24–31, are not used.

FIG. 4e shows in more detail the 16 bits of the 2 control bytes 60 of each row in the cache directory table 50. Bits 00–09 of the 16 bit control show specific flags indicative of various conditions relevant to the row in the cache directory table 50 or the block of data referred to by the row. The bits are interpreted as follows:

---

Bit 00 (er) = 1 means this row is empty.
 = 0 means this row has data in it.
Bit 01 (le) = 1 means this row is an LRU-List-Entry 56.
 = 0 means this row is not an LRU-List-Entry 56.
Bit 02 (pe) = 1 means this row is a Partition-Entry 58.
 = 0 means this row is not a Partition Entry 58.
Bit 03 (ac) = 1 means this row is an Available-Space List Entry 54.
 = 0 means this row is not an Available-Space List Entry 54.
Bit 04 (pz) = 1 means the block referred to by this entry is
 in partition P0.
 = 0 means the block referred to by this entry is
 not in partition P0.
Bit 05 (ic) = 1 means the block referred to by this entry is in
 the cache array.
 = 0 means the block referred to by this entry is
 not in the cache array.
Bit 06 (db) = 1 means the block referred to by this entry
 has data different from the data for a block
 with the same name that resides on disk (the block
 is dirty). It has been written into by a host process and
 has not been written to disk.
 = 0 means the block referred to by this entry
 has data the same as the data for a block
 with the same name that resides on disk (the block
 is clean). It has not been written to disk.
Bit 07 (it) = 1 means the block referred to by this entry
 is in transit, either being filled from
 disk or host or being sent to disk or host
 = 0 means the block referred to by this entry
 is not in transit, it is neither being
 filled from disk or host nor disk or host. The
 remainder of the bits, bits 08–15, are reserved
 for other uses.

---

Referring to FIG. 4f, two examples of "names" for blocks of data are given. The first example, 100, illustrates a row called "a" in the cache directory table 50 which is a row with an LRU-List-Entry 56 with the name field, na, filled in. This name field is referred to as a[na], and in this case has a[na]=dev,cyl,hd,Rec where dev=device #, cyl=cylinder #, hd=head #, and Rec=record or block # which is a common way to address a block of data stored on disk. The second example, 101, illustrates a row called "b" in the cache directory table 50 which is a row with an LRU-List-Entry 58 with the name field, na, filled in. This name field is referred to as b[na], and in this case has b[na]=DBID,PSID,Sec,Page where, DBID=database #, PSID=pagespace #, Sec=dataset partition #, and Page=page # which is a common way to name a page in a database system. The third example, 102, illustrates a row called "c" in the cache directory table 50 which is a row with a Partition-Entry 54 with the name field, PN, filled in. This name field is referred to as c[PN], and in this case has c[PN]=Pt # or the number for partition t. Any unique name can be used in the name fields (na) or (PN) and the invention will still operate.

Another part of this invention is the dynamic assignment of DataTypes to blocks of data stored in the cache array. FIG. 5 depicts a preferred embodiment of a data typing table which is stored in the cache manager memory 42 and is used by the cache manager 34 to dynamically assign DataTypes to blocks of data stored in the cache array 36.

Referring to FIG. 5, the data typing table 110 is divided into rows of 16 bytes each. The first 12 bytes 112 are reserved for the "name" or part of a name for a block of data. The next two bytes 114 are reserved for who made the request and/or what kind of request was made. The last two bytes of each row give the DataType 116 to be assigned to the requested block by the cache manager. In this example, the name of interest is the Dev part of the (dev,cyl,hd,rec) name of a block, and the kind of request is either a read, write, or prefetch. This table 110 represents a table that would be used by the cache manager to categorize blocks of requested data into 10 DataTypes according to usage and location. The first DataType, T1, is given to any block that is about to modified by a write request from a process running in a host computer. This is accomplished by the steps of: the cache manager receiving a request from the host to write into a block of data; the cache manager using the (device #) part of the (dev,cyl,hd,rec) name of the requested block and the cache manager using the write command to find a row with both the corresponding dev in column 1 and the corresponding write request in column 2; and the cache manager obtaining the DataType, T1, from column 3 of that row and putting the DataType in the DataType field of the correct LRU-List-Entry 56. In a similar manner, the cache manager would assign DataType T2 to any prefetch command for a block on devices with device addresses starting with hex 'C'. The cache manager would assign DataType T3 to any prefetch command for a block on devices with device addresses starting with hex 'D', and T4 to prefetch commands to the other devices. In a similar manner, the cache manager would assign DataType T10 to any read command for a block on devices with device addresses starting with hex 'B' or 'E' and the cache manager would assign DataTypes T5,T6,T7,T8, and T9 to any read command for a block on devices with device addresses 'C01','C02','C11', 'D09', and 'D10', respectively. Thus, this example illustrates that a cache manager using such a table would assign different DataTypes to the same block of data depending on whether the block was requested for a read, write, or prefetch.

One of the major advantages of this invention is the ability of the cache manager to manage the partitions such as shown in FIG. 2 from a single table stored in memory 42 used by the cache manager 34. Whereas FIG. 2 shows a Partitioned Cache array holding 25 blocks with each block belonging to one of 5 DataTypes, FIG. 6 illustrates the preferred embodiment of a cache directory table showing 50 rows and 14 columns with entries necessary for multiple partition management in a Partitioned Cache array holding 18 blocks with each block belonging to one of three DataTypes, T1, T2, or T3. Six of the control bits for each row are shown in the first six columns of FIG. 6. The first 6 rows contain Partition-Entrys and have the cn(pe) bit=1. The partition names, given by the PN field of the Partition-Entry (column 7 in the table) are P0, P1, . . . , P5 respectively. The MB field of the partitions indicate that partition P0 can hold a maximum of 8 blocks, P1 7 blocks, P2 3 blocks, and P3 0 blocks. The NB field of the partitions indicate that each partition is full, currently storing the maximum number of blocks.

In the preferred embodiment, the PF field 118 (column 13 of FIG. 6) of the row for partition P0 (row-0) has the unique role of giving the row number of the first entry in an LRU-List used to manage this "Partitioned-Cache". Since the value in P0[PF]=12, the entry in row 12 119 of the table starts the LRU-List needed by the cache manager, and represents the most recently referenced MRU block of data in the cache array. This row is said to be the top entry in the LRU-List. Referring to row-12 of FIG. 6, it is not empty (row-12 control field (cn) bit 0 (er) is 0 or R12[cn(er)]=0), it is an LRU-List-Entry (R12[cn(le)]=1), it is not a Partition-Entry (R12[cn(pe)]=0), it is not an Available-Space-Entry (R12[cn(ac)]=0), it is in partition P0 (R12[cn(pz)]=1), and the block of data represented by this entry is in the cache array (R12[cn(ic)]=1). Continuing across Row 12 of FIG. 6, the DataType of the block of data represented by this entry is type 1 (R12[DT]=1), this block has the name "name-01" (R12[na]=name-01), the block of data represented by this entry is stored in frame 11 in the cache array (R12[ca]=11), the next most recently used (referenced) block is referred to by the entry stored in row 33 of the table (R12[LF]=33), and the least recently used (LRU) block is referred to by the entry stored in row 17 of the table (R12[LB]=17). In a similar manner, row 33 has the same control bits, and the DataType of the block of data represented by this entry is type 2 (R33[DT]=2), this block has the name "name-02" (R33[na]=name-02), the block of data represented by this entry is stored in frame 04 in the cache array (R33[ca]=04), the next most used block is referred to by the entry stored in row 20 of the table (R33[LF]=20), and the least recently referenced block is referred to by the entry stored in row 12 of the table (R33[LB]=12).

Whereas FIG. 6 illustrates the data as it is stored in the cache directory, FIG. 7 presents the LRU-List in top to bottom order where for any LRU-List-Entry X (corresponding to row-X in the cache directory table) only fields X[na], X[DT], and X[cn(ic)] are shown. For any Partition-Entry Pt (corresponding to row-t in the cache directory table) only fields Pt[PN], Pt[MB], and Pt[NB] are shown in FIG. 7.

FIG. 7 illustrates the preferred embodiment of the steps necessary for a cache manager to manage a "Partitioned-Cache" array holding 18 blocks with each block belonging to one of three DataTypes, T1, T2, or T3. The LRU-List illustrated in Step 1 of FIG. 7 is the LRU-List represented by the entries in the cache directory of FIG. 6 and shows an LRU-List for three DataTypes, M+1=4 partitions of block sizes C0=8, C1=7, C2=3, and C3=0, corresponding to partitions P0, which can hold blocks of data of any DataType (T1, T2, or T3), P1 which can hold only blocks of DataType T1, P2 which can hold only blocks of DataType T2, and P3 which can hold only DataType T3, respectively. Each Step in FIG. 7 illustrates an LRU-List containing both LRU-List-Entries and Partition-Entries, but only a part of the complete entries described in FIGS. 4a–4f and illustrated in FIG. 6 are shown in FIG. 7 because that is sufficient to demonstrate the invention.

Referring to the LRU-List for Step 1 120 in FIG. 7, the top LRU-List-Entry is the most recently referenced block in the cache array. It has a name [na]="Name-01" 122, a DataType [DT]=T1 124 and an in cache bit (ic)=1 126 that says that the block is present in the cache array. The next most recently referenced block in the cache array has [na]="Name-02", [DT]=T2, and (ic)=1 that says that the block is present in the cache array. Similar statements can be made about the top eight LRU-List-Entries shown in Step 1. The ninth entry from the top of the LRU-List is a Partition-Entry 128. It has a name field [PN]=P0, meaning it refers to Partition-0, a Maximum Number of Blocks field [MB]=08, and a Total Number of Blocks field [NB]=08 meaning that all blocks in the partition are filled. The position in the LRU-List of the Partition-Entry for partition P0 128 is not an accident. It is ninth from the top because the eight blocks above it with (ic)=1 in the LRU-List are precisely the eight blocks allocated to partition P0.

The 28-th entry from the top of the LRU-List is also a Partition-Entry 130. It has [PN]=P1, meaning it refers to Partition-1, a Maximum Number of Blocks field [MB]=07, and a Total Number of Blocks field [NB]=07 meaning that all blocks in the partition are filled. The position in the LRU-List of the Partition-Entry for partition P1 130 is also not an accident. It is 28-th from the top because there are exactly 7 LRU-List-Entries above it having DataType T1 and (ic)=1 lying between the Partition-Entry for P1 and the Partition-Entry for P0.

The 17-th entry from the top of the LRU-List is also a Partition-Entry 132 with [PN]=P2, [MB]=03, and [NB]=03, meaning that all blocks in the partition are filled. Partition-Entry P2 is 17-th from the top because there are exactly 3 LRU-List-Entries above it having DataType T2 and (ic)=1 lying between the Partition-Entry for P2 and the Partition-Entry for P0.

Still referring to Step 1 of FIG. 7, the 10-th entry from the top of the LRU-List is the last Partition-Entry 134, has [PN]=P3, [MB]=0, and [NB]=0, meaning it can store no blocks and no blocks are allocated to it. Partition-Entry P3 is 10-th from the top because there are exactly zero LRU-List-Entries above it having DataType T3 and (ic)=1 lying between the Partition-Entry for P3 and the Partition-Entry for P0.

LRU-List-Entries in FIG. 7 that have (ic)=0 are important to the present invention because they represent historical data that means that they were last requested more recently than the LRU-List-Entry below it in the list, less recently than the LRU-List-Entry above it in the list, and the space for it in the cache array has been given to some other block so it is currently not in the cache array. A use for these entries will be given later when "re-fetch" is discussed.

It is now important to discuss how the cache manager finds an entry in the cache directory table of FIG. 6. Referring to FIG. 3, when a host process requests the cache manager to transfer a block of data to or from the host memory, the host process requests the block by its "name", indicates who made the request, and why it was requested.

Figure 10:
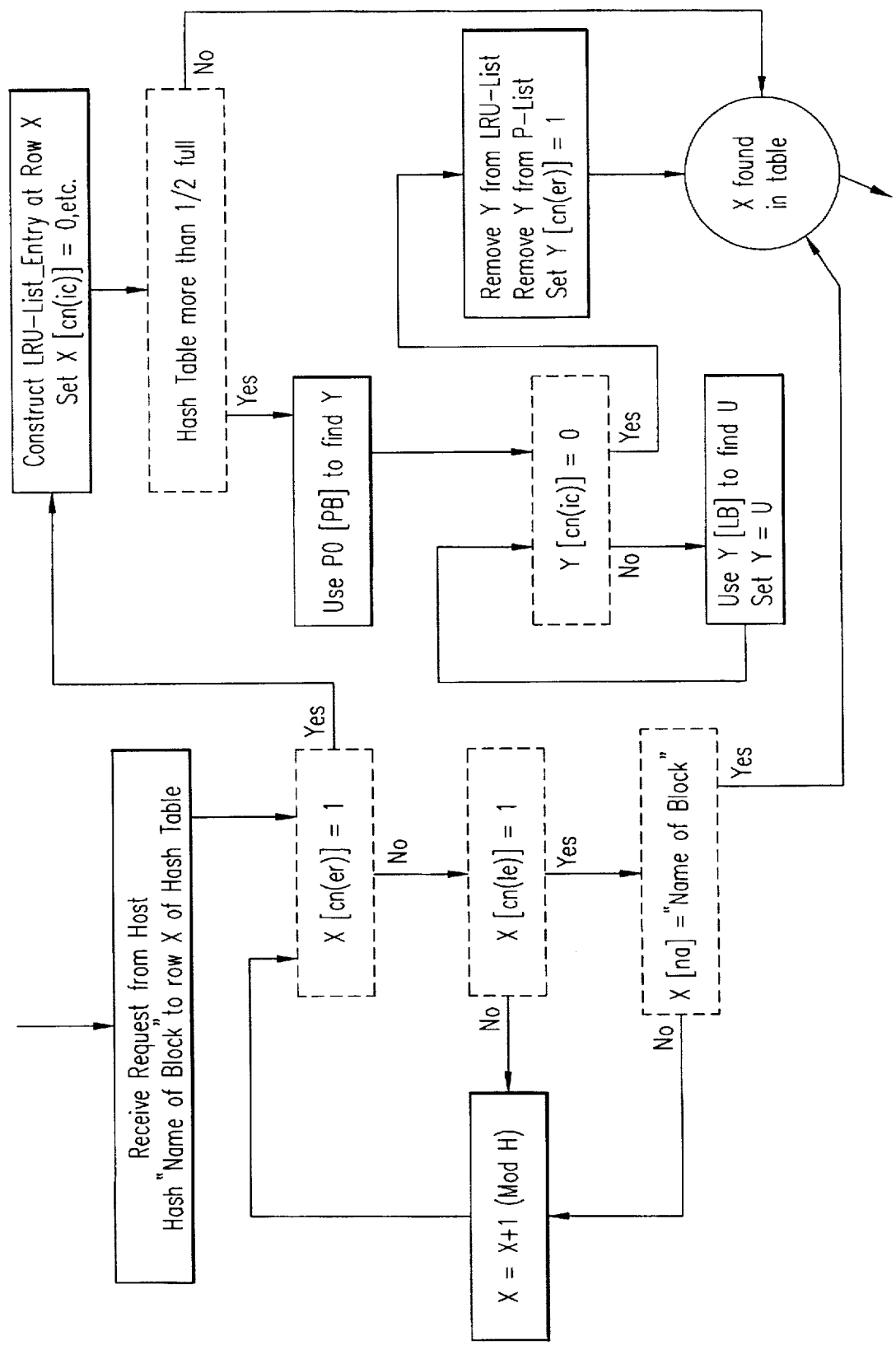
FIG. 10 is a schematic illustration of a flow chart describing the process executed by the cache manager to locate a request in the cache directory for the present invention.

Referring to FIG. 4a, FIG. 4b, FIG. 4f, and FIG. 6, the requested "name" is hashed to a row number in the hash table 51 part of the cache directory table 50 by any one of a variety of hashing techniques known to one skilled in the art of hashing. The requested "name" is compared with the name field 62 part of the LRU-Entry at that row address. If the "names" match, the requested block was found in the LRU-List. If the "names" do not match, the next row in the cache directory is examined. If the "next row" is beyond the bottom of the hash table, the first entry in the hash table is examined. If the name in this row matches the requested name, the requested block was found, otherwise the next row is examined, etc., until a match is found or an empty row is reached. If an empty row (er)=1 is located before a match is found, the cache manager fills in the empty row making it an LRU-List-Entry by setting (er)=0, (le)=1, and [na]= "name". Other details of this process, such as deleting entries when the hash table becomes more than half full, are indicated in the flow chart shown in FIG. 10.

Assume that the request is for "name 12" and that an entry for that name is located in row-31 (see FIG. 6) of the cache directory and the 14-th item in the LRU-List (see FIG. 7). The cache manager is now ready to proceed with satisfying the request and updating the LRU-List. Referring to FIG. 6, since R31[cn(ic)]=1, the cache manager can send or receive data into the associated block located at cache frame R31 [ca]=16 in the cache array. Having satisfied the request, the cache manager must then determine which partition contained the page, logically remove the page from that partition, and logically put the page as the most recently referenced page in partition P0. Those skilled in the art will recognize that removing an item from a double linked list is a simple matter of changing four pointer values in the list. Thus, the entry for Name 12 can be removed from the list shown in Step 1 of FIG. 7. Since Name 12 had a DataType of T2, it was in partition P2 of the "Partitioned Cache". Referring to FIG. 7, the Partition Entry for P2 is easily located in the Table as being row 2. Since Name 12 has logically been removed from P2, the Total Number of Blocks, R31[NB], must be reduced by one as is illustrated by P2 138 in Step 2 of FIG. 7.

At this point, the cache manager determines the new DataType, T1, for the block referred to by R31, makes R31[DT]=T1, and puts "name 12" at the top of the LRU-List as illustrated in Step-2 of FIG. 7. Those skilled in the art will recognize that adding Name-12 to the top of a double linked list is a simple matter of changing four pointer values in the list.

Referring to FIG. 6 again, the Partition-Entry for P0 is easily located at row 0 in the table. Since Name 12 should be logically added to P0, the Total Number of Blocks P0[NB] must be increased by one as is illustrated by P0 140 in Step-2 of FIG. 7.

The LRU-List shown in Step 2 of FIG. 7 is inconsistent. The Partition-Entry for P0 140 indicates that P0 can hold a maximum of 8 blocks and 9 have been assigned to it. This inconsistency can be solved by exchanging P0 and the LRU-List-Entry 142 just above P0. One skilled in the art will recognize that this can be done by changing 6 pointer values in the doubly linked LRU-List. However since entry 142 had a DataType of T1, the block for Name-08 142 was logically moved from P0 to P1 and P0[NB] field of P0 146 must be decreased by one and the P1[NB] field of P1 144 must be increased by one as shown in Step 3 of FIG. 7.

The LRU-List shown in Step 3 of FIG. 7 is still inconsistent. The Partition-Entry for P1 144 indicates that P1 can hold a maximum of 7 blocks and 8 have been assigned to it. This inconsistency can be solved by moving P1 toward the top of the LRU-List until it is above the first entry encountered with DataType T1 and (ic)=1, then subtracting one from the P1[NB] field in P1 148 as shown in Step 4 of FIG. 7. Since this would leave an LRU-List-Entry 150 below P1 with DataType T1 and (ic)=1, the cache manager must make (ic)=0 for the entry corresponding to "name-24" by either writing the corresponding block of data in the cache array to disk, or otherwise make this space available and add the available cache address to the available list. To make the space available, an empty row is located in the hash table by generating a random name, hashing it to a row number in the table, if the row is empty an empty row has been found, otherwise examine the next row in the table, etc., until an empty row is found. To make that row an available space row, make (er)=0, (av)=1. Put the cache frame number in the [ca] field, and add this entry just after the "top" of available-space list entry located as the last row of the cache directory of FIG. 6. Then (ic)=0 in the "name 24" 152 entry as shown in Step 4 of FIG. 7.

Figure 11:
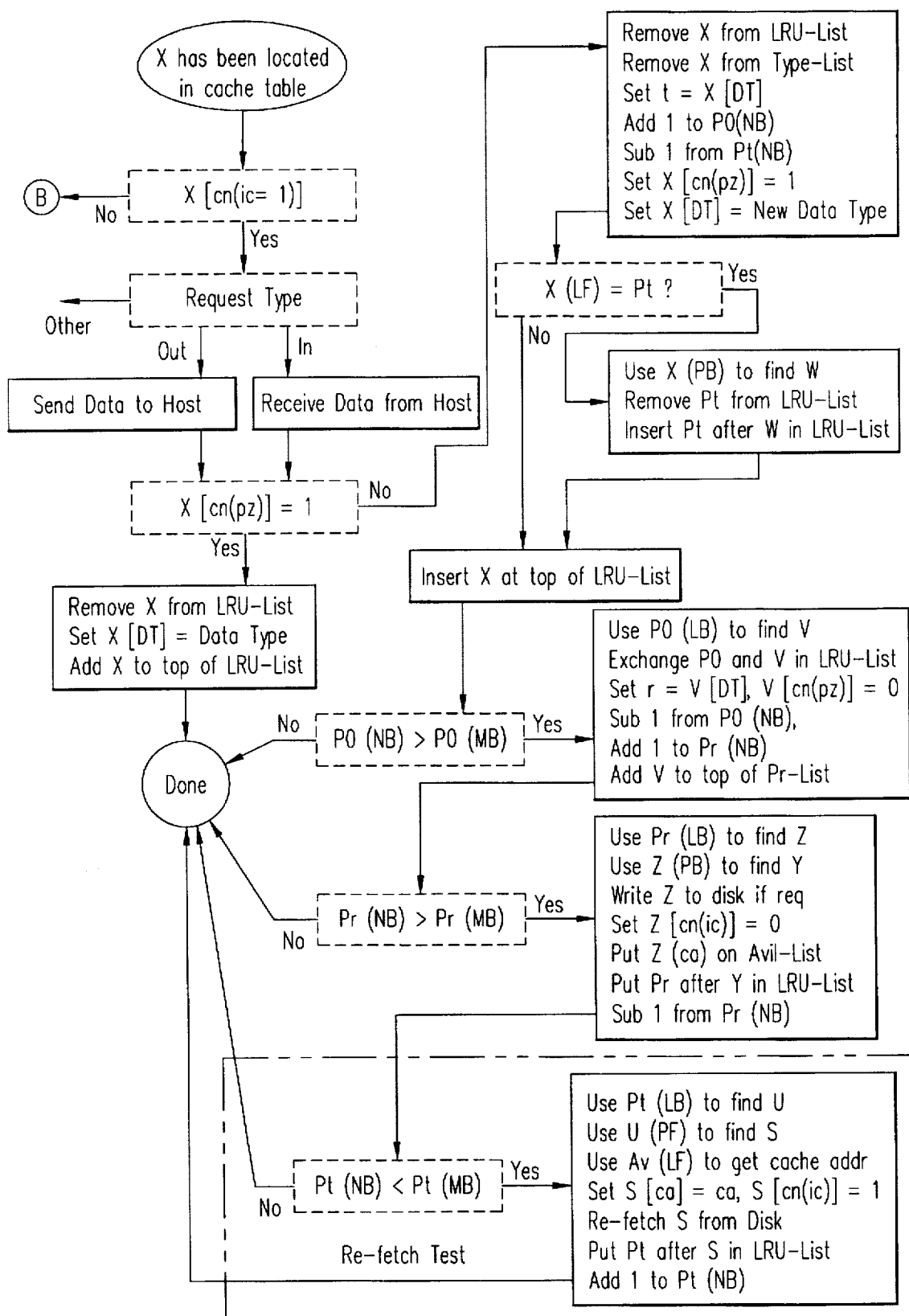
FIG. 11 is a schematic illustration of a flow chart describing the process executed by the cache manager to update entries in the cache directory after a cache hit for the present invention.
Figure 12:
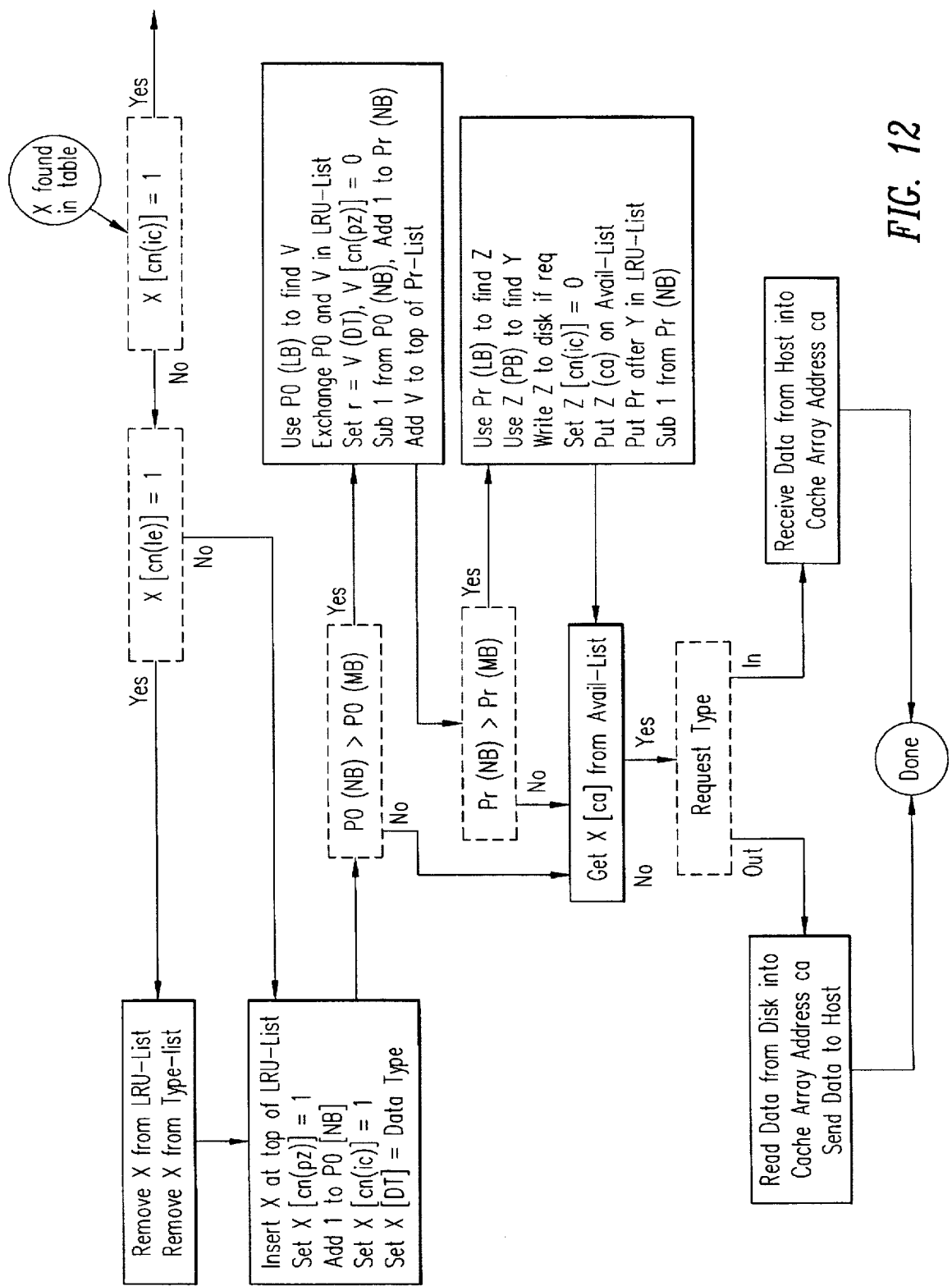
FIG. 12 is a schematic illustration of a flow chart describing the process executed by the cache manager to update entries in the cache directory after a cache miss for the present invention.

Referring to Step 4 of FIG. 7, the LRU-List is consistent, but the cache manager now has a unique opportunity as a direct result of this Partitioned Cache structure. P2 154 has P2[MB]=3 and P2[NB]=2, meaning that there is a hole (it is not full) in partition 2. Thus, the cache manager can "re-fetch" the first LRU-List-Entry 156 below P2 into the cache array at an available cache array location (as obtained from the available-space list). Then P2 154 can be moved down to be located just below "name 15" 156 and P2[NB] increased by one to =3. In many cases, this re-fetching of old data can increase the hits and response time to the cache because (in this case) it could be better to have an old entry of DataType T2 in the cache than an old entry of DataType T1 (which was pushed out of the cache in Step 3 of FIG. 7). Details performed by the cache manager to implement the above changes to the LRU-List are given in the flow diagrams of FIGS. 11 and 12. Those skilled in the art can recognize these flow diagrams as descriptive of a program stored in memory 42 executable by a computer processor located in the cache manager 34 of FIG. 3 which will cause bytes in the cache directory, also stored in memory 42, to be updated and thus reflect the actions described in FIG. 7.

According to the present invention, periodic changing of partition sizes is provided in accordance with an external request to the cache manager. For example, if the partitions were allocated as shown in Step 1 of FIG. 7 to be C0=8, C1=7, C2=3, and C3=0 and an external process requested that they be changed to C0=4, C1=3, C2=4, and C3=7, the cache manager would change the respective [MB] fields in the Partition-Entries for P0, P1, P2, and P3 to be 4, 3, 4, and 7 as shown in Step 1 of FIG. 8.

Figure 8B:
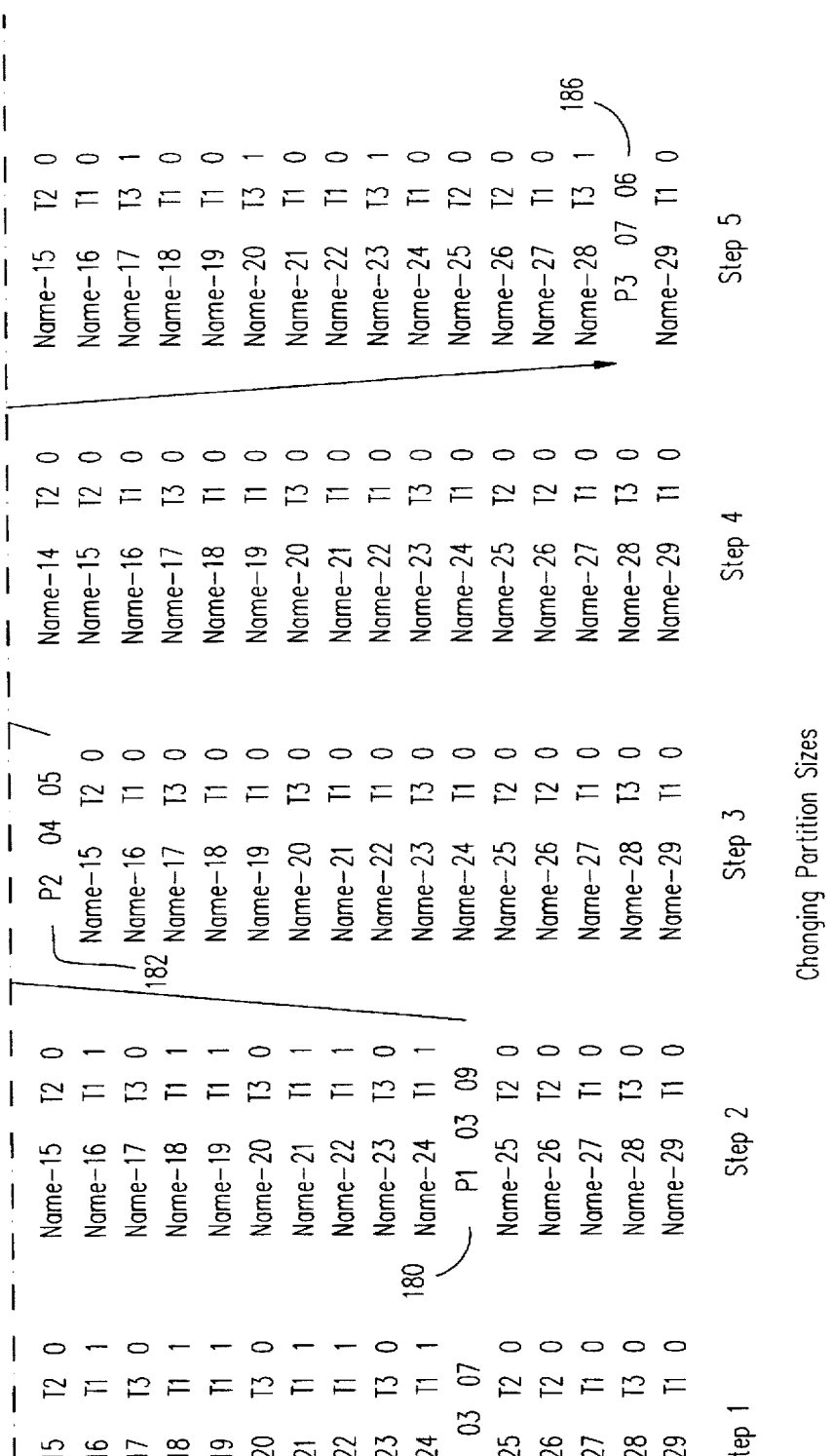
FIG. 8 is a schematic illustration of steps required to change the partition sizes in a Partitioned Cache as P0 diminishes.

The LRU-List shown in Step 1 of FIG. 8 is inconsistent. The Partition-Entry for P0 170 indicates that P0 can hold a maximum of 4 blocks and 8 have been assigned to it. This inconsistency can be solved by moving P0 170 toward the top of the LRU-List. First, past Name-08 whereby one is subtracted from the [NB] field of P0 and one is added to the [NB] field of P1, then past Name-07 whereby one is subtracted from the [NB] field of P0 and one is added to the [NB] field of P2, then past Name-06 whereby one is subtracted from the [NB] field of P0 and one is added to the [NB] field of P1, then past Name-05 whereby one is subtracted from the [NB] field of P0 and one is added to the [NB] field of P2, and partition P0 is consistent. The LRU-List would then be as shown in Step-2 of FIG. 8.

The LRU-List shown in Step 2 of FIG. 8 is also inconsistent. The Partition-Entry for P1 180 indicates that P1 can hold a maximum of 3 blocks and 9 have been assigned to it. This inconsistency can be solved by the cache manager moving P1 180 toward the top of the LRU-List until 6 LRU-List-Entries with DataType T1 and (ic)=1 are below P1. The process of moving P1 up the LRU-List past entries with [DT]=T1 is facilitated by the use of partition forward and backward pointers [PF] and [PB] illustrated in the cache directory table shown in FIG. 6. Details performed by the cache manager to implement this movement of a Partition-Entry are given in the flow diagram of FIG. 13. Those skilled in the art can recognize that this flow diagram is descriptive of a program stored in memory 42 executable by a computer processor located in the cache manager 34 of FIG. 3 which will cause bytes in the cache directory, also stored in memory 42, to be updated and thus reflect the actions described in FIG. 8.

As each LRU-List-Entry with DataType T1 and (ic)=1 is put below P1, the cache manager must see to it that: the block corresponding to the LRU-List-Entry with DataType T1 and (ic)=1 in the cache array is written to disk if its data is different from that on disk; (ic)=0, and one is subtracted from the [NB] field in P1. The result of these operations is shown in Step 3 of FIG. 8.

The LRU-List shown in Step-3 of FIG. 8 is still inconsistent. The Partition-Entry for P2 182 indicates that P2 can hold a maximum of 4 blocks and 5 have been assigned to it. This inconsistency can be solved by the cache manager moving P2 182 toward the top of the LRU-List until one LRU-List-Entry with DataType T2 and (ic)=1 are below P2. As each LRU-List-Entry with DataType T2 and (ic)=1 is put below P2, the cache manager must see to it that: the block corresponding to the LRU-List-Entry with DataType T2 and (ic)=1 in the cache array is written to disk if its data is different from that on disk; the bit is changed to (ic)=0; and one is subtracted from the [NB] field in P2. The result of this operation is shown in Step-4 of FIG. 8.

Referring to Step 4 of FIG. 8, the LRU-List is consistent, but the cache manager now has a unique opportunity as a direct result of this Partitioned Cache structure. P3 184 has [MB] of 7 and [NB] of 0 meaning that there 7 empty blocks or holes in partition P2. Thus, the cache manager can "re-fetch" up to seven blocks of DataType T3 from disk. The blocks to re-fetch can be determined by the cache manager by moving P3 184 toward the bottom of the LRU-List until either the end of the LRU-List is reached or 7 blocks of DataType T3 are above P3 in the list. As each LRU-List-Entry with DataType T3 and (ic)=0 is put above P3, the cache manager must see to it that: the block corresponding to the LRU-List-Entry with DataType T3 and (ic)=0 is fetched from disk, tagged with DataType T3 and written into a free location in the cache array; the bit is changed to (ic)=1; and one is added to the [NB] field in P3. If the cache manager elects to do this re-fetching, the result is as shown in Step 5 of FIG. 8 where there is still one empty block in P3 186 because the bottom of the LRU-List was reached after only 6 re-fetches were found in the historical part of the LRU-List.

Figure 9B:
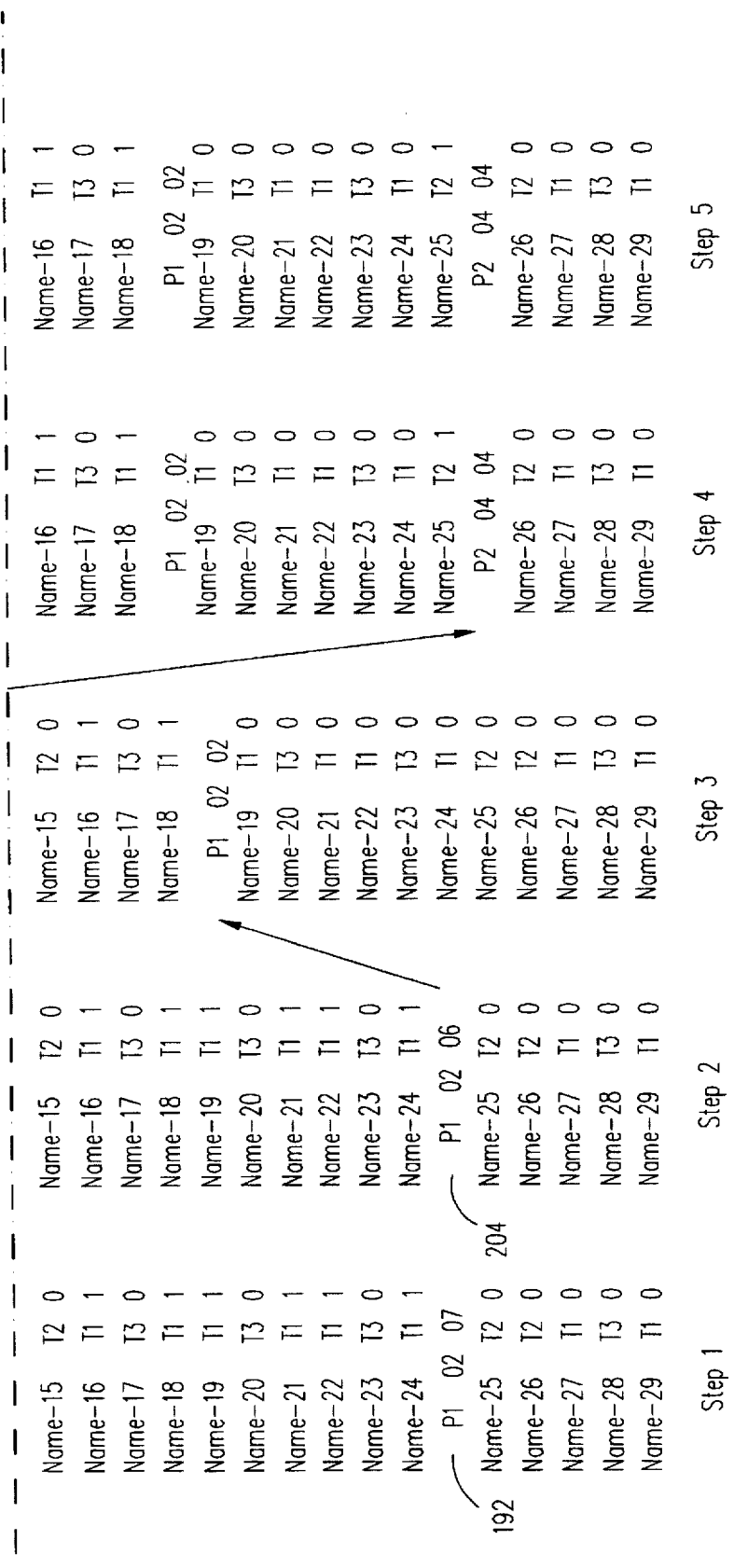
FIG. 9 is a schematic illustration of steps required to change the partition sizes in a Partitioned Cache as P0 diminishes.
Figure 13:
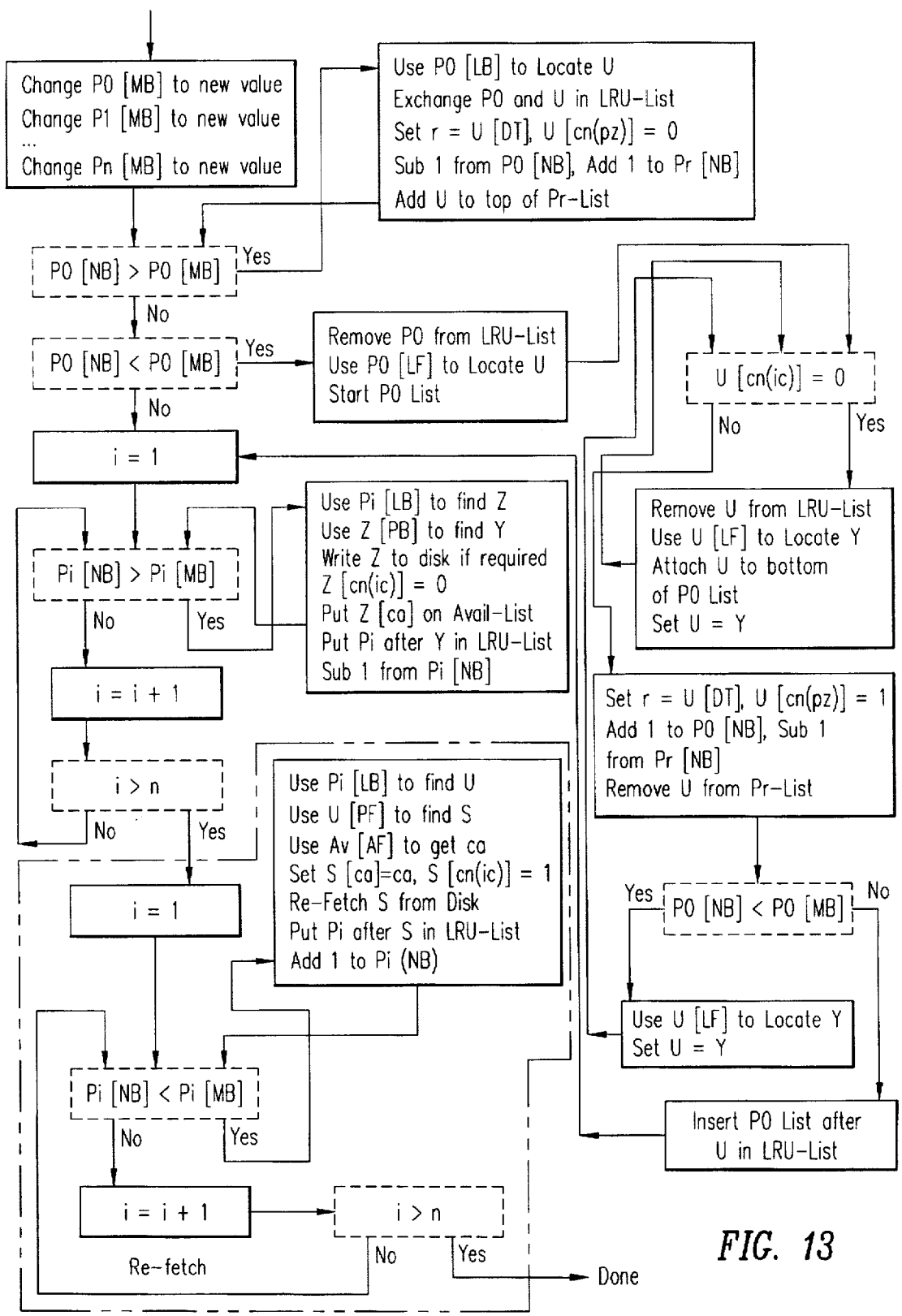
FIG. 13 is a schematic illustration of a flow chart describing the process executed by the cache manager to change partition sizes in the partitioned cache of this invention for the present invention.

FIG. 9 gives a second example of applying the flow diagram shown in FIG. 13 to change Partition Sizes where, in contrast to FIG. 8 where P0 gets smaller, P0 gets larger. According to the present invention, periodic changing of partition sizes is provided in accordance with an external request to the cache manager. For example, if the partitions were allocated as shown in Step-1 of FIG. 7 to be C0=8, C1=7, C2=3, and C3=0 and an external process requested that they be changed to C0=10, C1=2, C2=4, and C3=2, the cache manager would change the respective [MB] fields in the Partition-Entries for P0 190, P1 192, P2 194, and P3 196 to be 10, 2, 4, and 2 as shown in Step 1 of FIG. 9.

Referring to the LRU-List shown in Step 1 of FIG. 9, the Partition-Entry for P0 190 indicates that P0 can hold a maximum of 10 blocks and 8 have been assigned to it. The size of the this partition can be increased by moving P0 190 toward the bottom of the LRU-List until two additional LRU-List-Entries that have (ic)=1 are above P0. However, P0 cannot be below any other partition so P3 must also be pushed down the LRU-List. Thus, the cache manager attempts to move P0 and P3 down past Name-09, but since Name-09 has DataType T3 and the [NB]=0 field of P3 indicates that no blocks are allocated between P3 and P0, Name-09 must be added to the bottom of the P0,P3 chain and pushed along with P0 and P3 down past Name-10 where because its (ic)=1, the cache manager adds one to the [NB] field of P0 and subtracts one from the [NB] field of P1, then down past Name-11 where the cache manager adds one to the [NB] field of P0 190 and subtracts one from the [NB] field of P2 194, at which point P0 200 is full. The resulting LRU List is shown in Step-2 of FIG. 9.

The LRU-List shown in Step-2 of FIG. 9 is inconsistent because the Partition-Entry for P1 204 indicates that P1 can hold a maximum of 2 blocks and 6 have been assigned to it. As before, this inconsistency can be solved by the cache manager moving P1 toward the top of the LRU-List until 4 LRU-List-Entries with DataType T1 and (ic)=1 are below P1. Each time an LRU-List-Entry of DataType T1 and (ic)=1 is put below P1, the cache manager subtracts one from the [NB] field of P1, sets (ic)=0, and, if the dirty bit=1, writes the corresponding block in the cache array back to disk. The result of this operation is shown in Step 3 of FIG. 9.

Referring to Step 3 of FIG. 9, the LRU List is consistent, but the cache manager again has a unique opportunity (as a direct result of this Partitioned-Cache structure) to "re-fetch" previously requested blocks into the cache array in anticipation of getting additional cache hits and lowering the response time of requesting host processes. P2 206 has [MB]=4 and [NB]=2 meaning that there are 2 empty blocks or holes in partition P2. Thus, the cache manager can re-fetch up to two blocks of DataType T2 from disk. The blocks to re-fetch can be determined by the cache manager moving P2 206 toward the bottom of the LRU-List until either the end of the LRU-List is reached or 2 blocks of DataType T2 are above P2 in the list. As each LRU-List-Entry with DataType T2 and (ic)=0 is put above P2, the cache manager must see to it that: the block corresponding to the LRU-List-Entry with DataType T2 and (ic)=0 is fetched from disk, tagged with DataType T2 and written into a free location in the cache array; the bit is changed to (ic)=1; and one is added to the [NB] field in If the cache manager elects to do this re-fetching, the result is as shown in Step 4 of FIG. 9.

Referring to Step 4 of FIG. 9, the LRU-List is consistent, but the cache manager again has a unique opportunity (as a direct result of this Partitioned Cache structure) to re-fetch previously requested blocks into the cache array in anticipation of getting additional cache hits and lowering the response time of requesting host processes. P3 208 has [MB]=2 and [NB]=0 meaning that there are 2 empty blocks or holes in partition P3. The cache manager can re-fetch two blocks of DataType T3 from disk, tag them with DataType T3, write them into free locations in the cache array, set (ic)=1, and add two to the [NB] field in P3. If the cache manager elects to do this re-fetching, the result is shown in Step 5 of FIG. 9.

Those skilled in the art will recognize that there has been described a partitioning and control system for dividing up a solid-state memory which fulfills the needs of the art and objects of the invention mentioned above. Specifically, a method for dynamically assigning DataTypes to blocks of data based on who requested them, how they were requested, the intent of the request, and the kind of information stored in the block is described.

While the invention has been shown and described with reference to the embodiments above, it will be understood by those skilled in the art that various changes in forms and detail may be made therein without departing from the essence, scope, and teaching of the invention. Furthermore, it will be appreciated that the method of the invention has applicability beyond embodiments specifically described. For example: 1) some of the control mechanisms can be used to control a cache that is physically partitioned (i.e. an in-host memory cache and disk caches); 2) by allowing for a hierarchy of DataTypes (e.g. T1 consists of subtypes T1b, T1c, ..., T1n), any or all of the partitions in the embodiment described above could themselves be divided into a Partitioned Cache and be managed by the same cache manager using the same LRU-List by simply including Sub-Partition-Entries (e.g. P1a, P1b, ..., P1n) in the LRU-List. 3) any cache, subcache, or partition of a cache that is managed by a single LRU List (i.e. those given in the references) could be partitioned into the Partitioned Cache, described in this invention, with the advantages given in the references added to the advantages of the Partitioned Cache given herein. 4) Since the embodiment of the cache directory illustrated in FIGS. 4a–4f and FIG. 6 orders blocks globally in one list and at the same time orders and controls the flow of the blocks in each partition, that cache directory can be used by other software programs to control partitioned caches that have an arbitrary logical flow of blocks from one partition to another, provide arbitrary orderings other than LRU, and allow blocks of differing sets of DataTypes to be in each partition. That is, a requested block could first go into partition P3, then flow to partition P1, then to P0, and when pushed from P0, go into either P1, P2, or P3 according to its DataType. The mechanism for such control is provided by the cache directory structure, the preferred embodiment of which is illustrated in FIGS. 4a–4f and FIG. 6.

Therefore, the description of the invention given above should not be considered as a limitation on its scope but only as exemplary thereof. Accordingly, the invention disclosed herein is to be limited only as specified in the following claims.

I claim:

1. A method for managing a cache hierarchy having a fixed total storage capacity, said cache hierarchy being sited in a data path coupling a processor to an external storage subsystem, comprising the steps of:

(a) logically partitioning said cache hierarchy to form a least recently used (LRU) global cache and a plurality of LRU destaging local caches, each local cache i being bound to objects having a unique data type $T(i)$, i being an identifier designating one of the plurality of local caches and $T(i)$ being an identifier designating the unique data type resident in cache i;

(b) responsive to access commands from said processor, storing objects of all types in said global cache and maintaining them in said global cache in LRU order, objects being staged to the global cache either from one of the local caches or from the external storage subsystem if not present in said local caches;

(c) upon the global cache attaining a cache full condition, destaging an LRU object of type $T(i)$ from the global cache to the local cache storing type $T(i)$ data, a cache full condition under an LRU global or local cache being one where the storage of an additional object in a cache results in the destaging of at least one object in LRU order; and (d) upon any one or more of the local caches attaining a cache full condition, destaging an LRU object from said one or more local caches to the external storage subsystem.

* * * * *